United States Patent
Hoshino et al.

(10) Patent No.: US 7,677,823 B2
(45) Date of Patent: Mar. 16, 2010

(54) ROLLED-PRINT-MEDIUM HOLDER DEVICE

(75) Inventors: Terumasa Hoshino, Nagoya (JP);
Yasunori Nakamura, Shinshiro (JP);
Tsutomu Kato, Nagoya (JP); Haruki Matsumoto, Nagoya (JP); Yoshihito Nonomura, Gifu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 18 days.

(21) Appl. No.: 11/150,278

(22) Filed: Jun. 13, 2005

(65) Prior Publication Data
US 2006/0051152 A1    Mar. 9, 2006

(30) Foreign Application Priority Data
Sep. 6, 2004    (JP) ............................ 2004-258697

(51) Int. Cl.
*B41J 15/02* (2006.01)
(52) U.S. Cl. ............... 400/613; 242/590; 242/609.4
(58) Field of Classification Search .............. None
See application file for complete search history.

(56) References Cited

U.S. PATENT DOCUMENTS

| | | | | |
|---|---|---|---|---|
| 2,605,980 | A * | 8/1952 | Atwood et al. ............ 242/118.7 |
| 3,389,872 | A | 6/1968 | Lyman | |
| 3,452,941 | A * | 7/1969 | Patton ....................... 242/571.4 |
| 5,531,399 | A * | 7/1996 | Weisburn et al. .......... 242/608.6 |
| 5,676,332 | A * | 10/1997 | Kraus et al. ............... 242/608.6 |
| 5,695,137 | A * | 12/1997 | Prospero et al. .......... 242/571.4 |
| 5,967,454 | A * | 10/1999 | Yarnell et al. ............. 242/608.4 |
| 6,152,350 | A | 11/2000 | Hayashi et al. | |
| 6,364,246 | B1 * | 4/2002 | Huang ....................... 242/608.5 |
| 6,478,249 | B1 * | 11/2002 | Orzel ........................ 242/608.4 |
| 6,874,726 | B2 * | 4/2005 | Ripplinger ................ 242/610.6 |
| 2001/0022775 | A1 | 9/2001 | Yeo et al. | |
| 2004/0035970 | A1 | 2/2004 | Fujii et al. | |

FOREIGN PATENT DOCUMENTS

JP    A 2004-30752    1/2004

* cited by examiner

*Primary Examiner*—Jill E Culler
(74) *Attorney, Agent, or Firm*—Oliff & Berridge, PLC

(57) ABSTRACT

A rolled-print-medium holder device includes an axial member, a holding member, an outer fitting portion, an inner fitting portion, and a weld portion. The holding member is fixed to at least one of both axial ends of the axial member and holds both sides of a rolled print medium. The outer fitting portion is provided at either one of the axial member and the holding member. The outer fitting portion has an inner peripheral surface. The inner fitting portion is provided at the other one of the axial member and the holding member. The inner fitting portion has an outer peripheral surface. The inner fitting portion is fitted into the outer fitting portion. The weld portion is provided at at least one of the inner fitting portion and the outer fitting portion. The weld portion at least fixes the outer peripheral surface to the inner peripheral surface by ultrasonic welding.

7 Claims, 23 Drawing Sheets

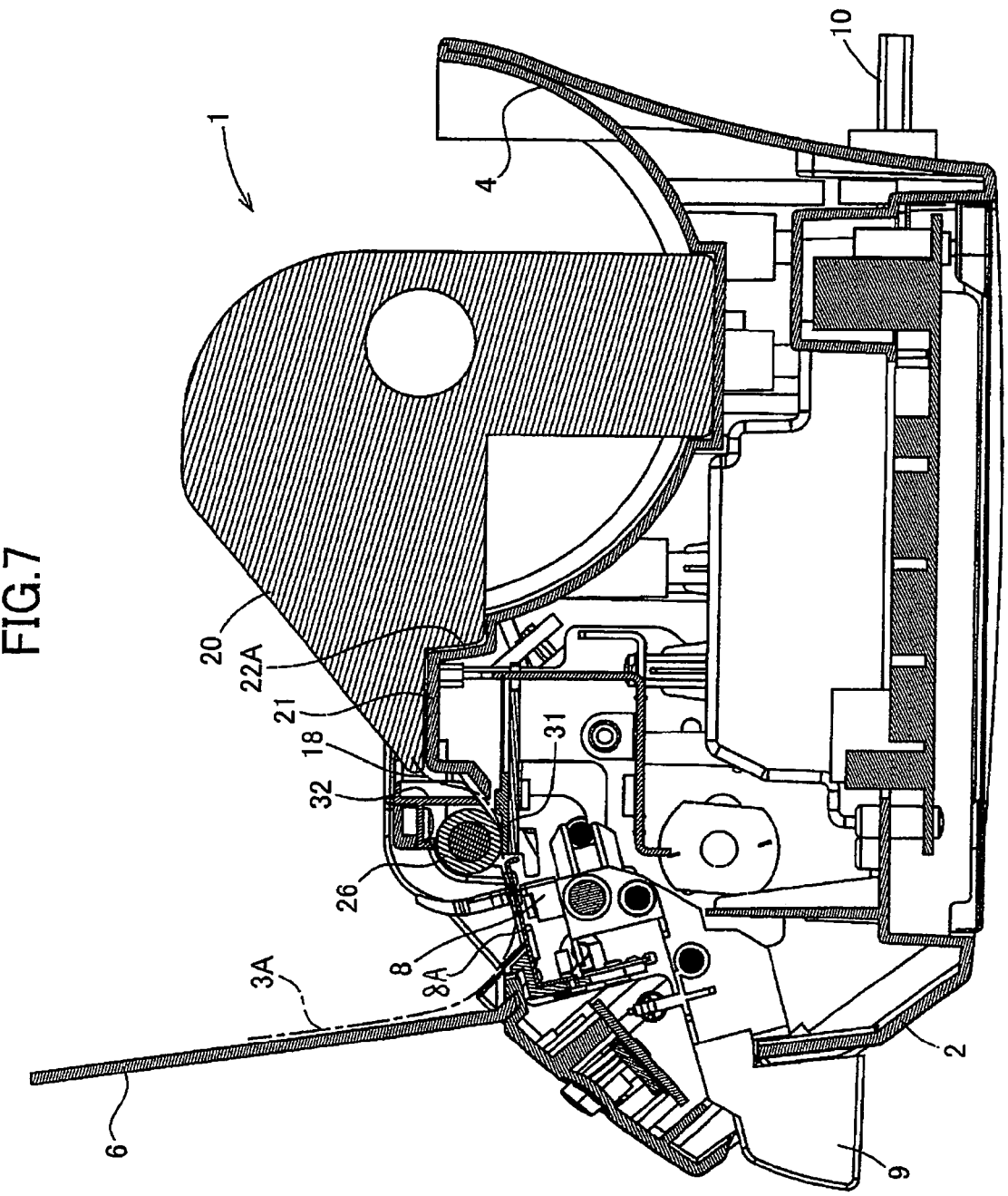

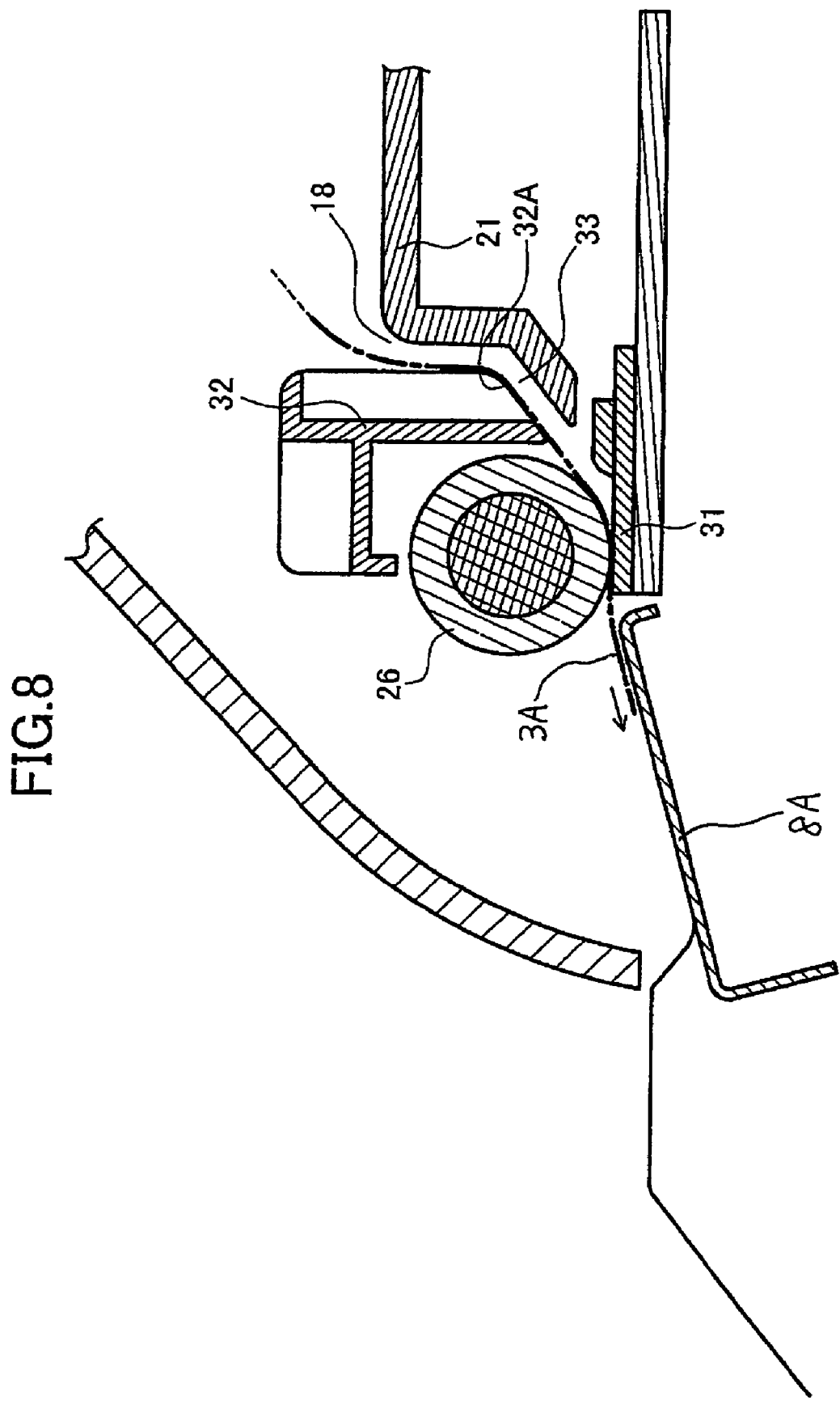

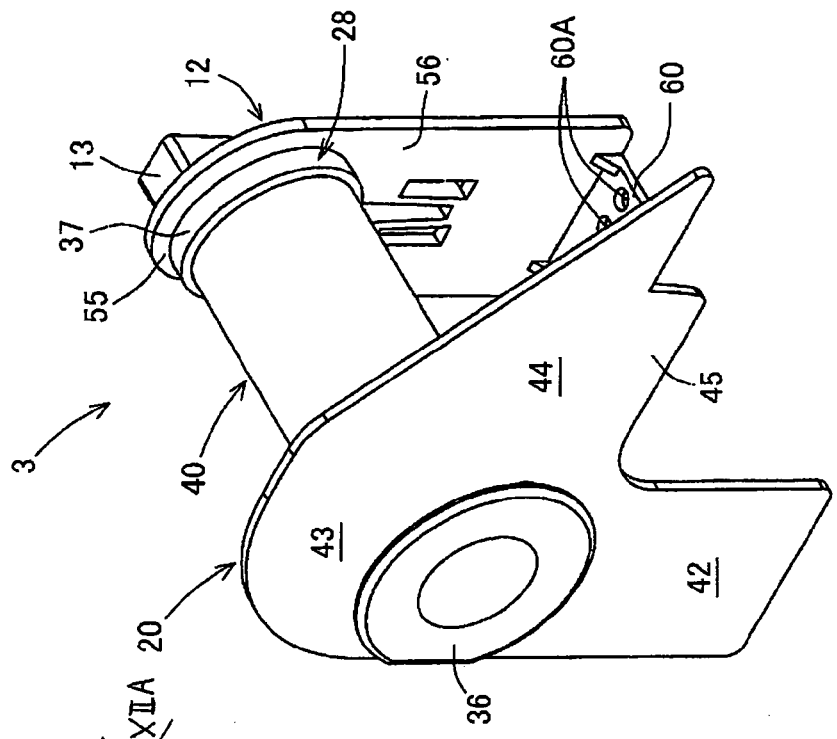
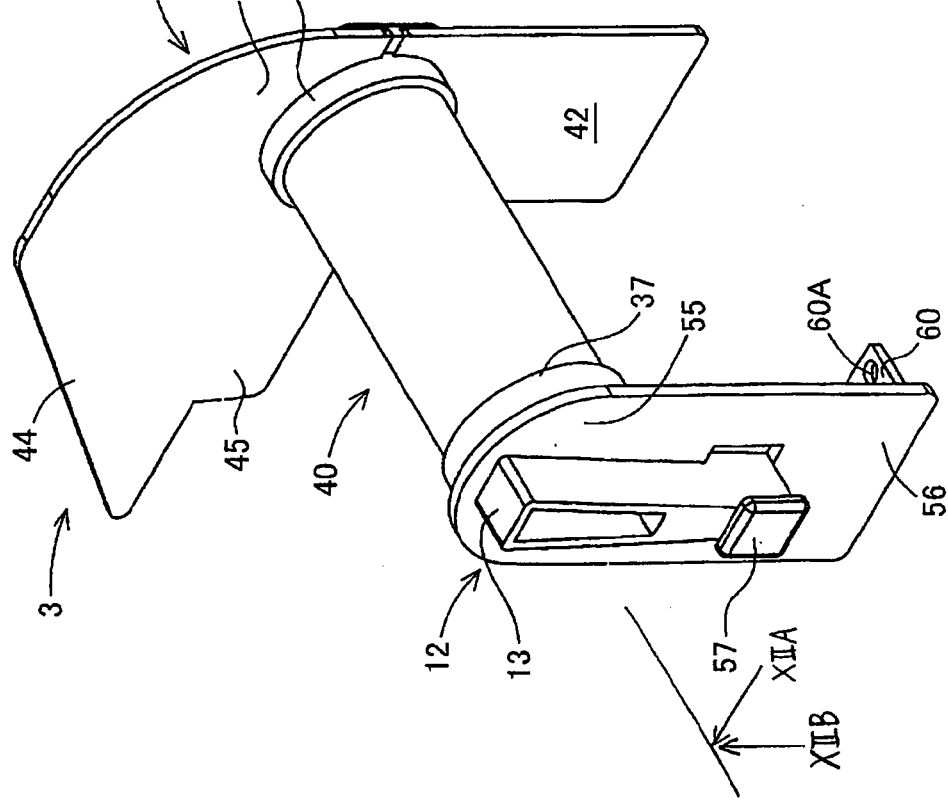

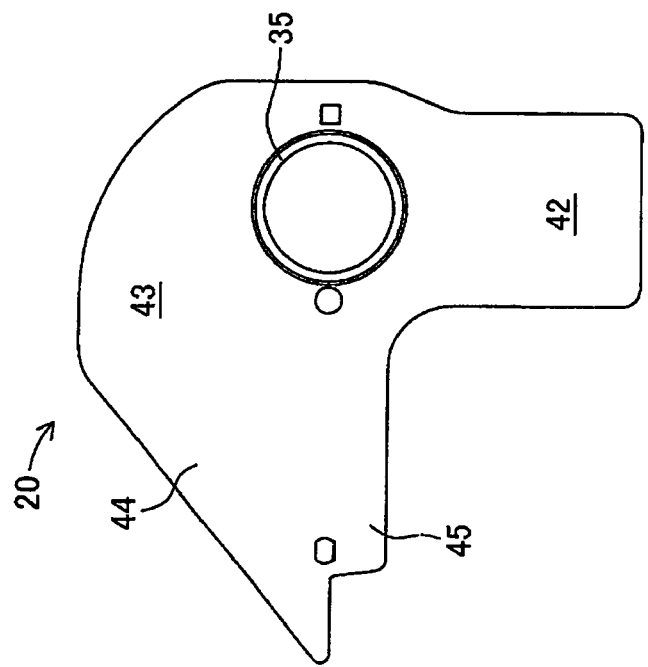
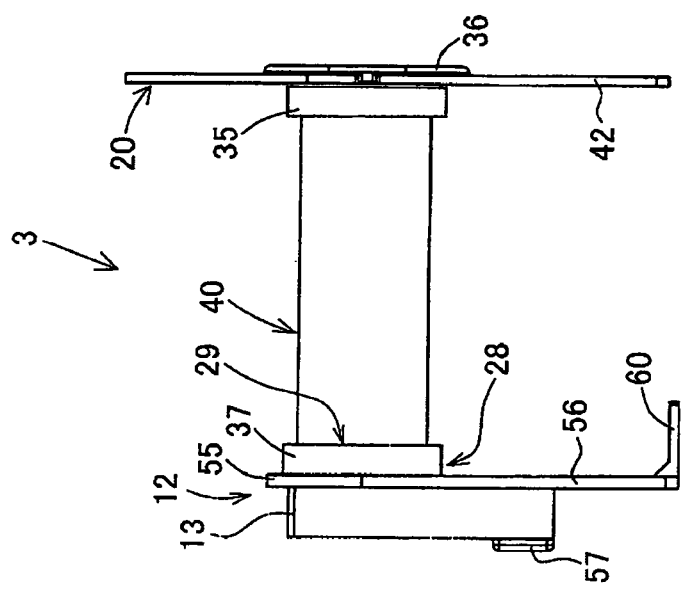
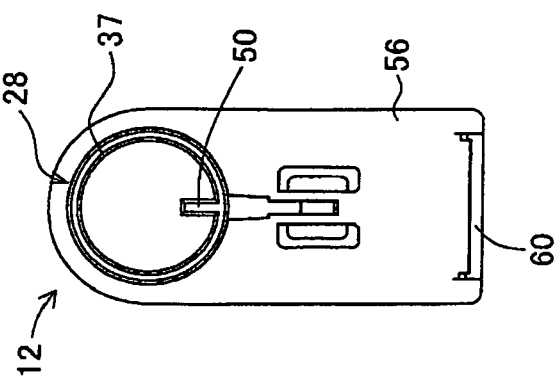

FIG.23
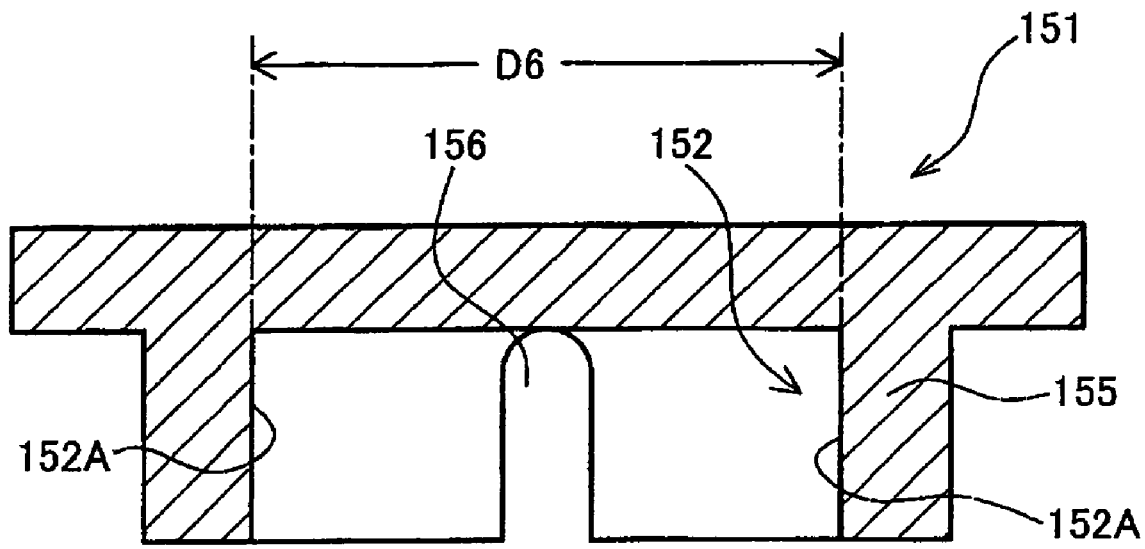
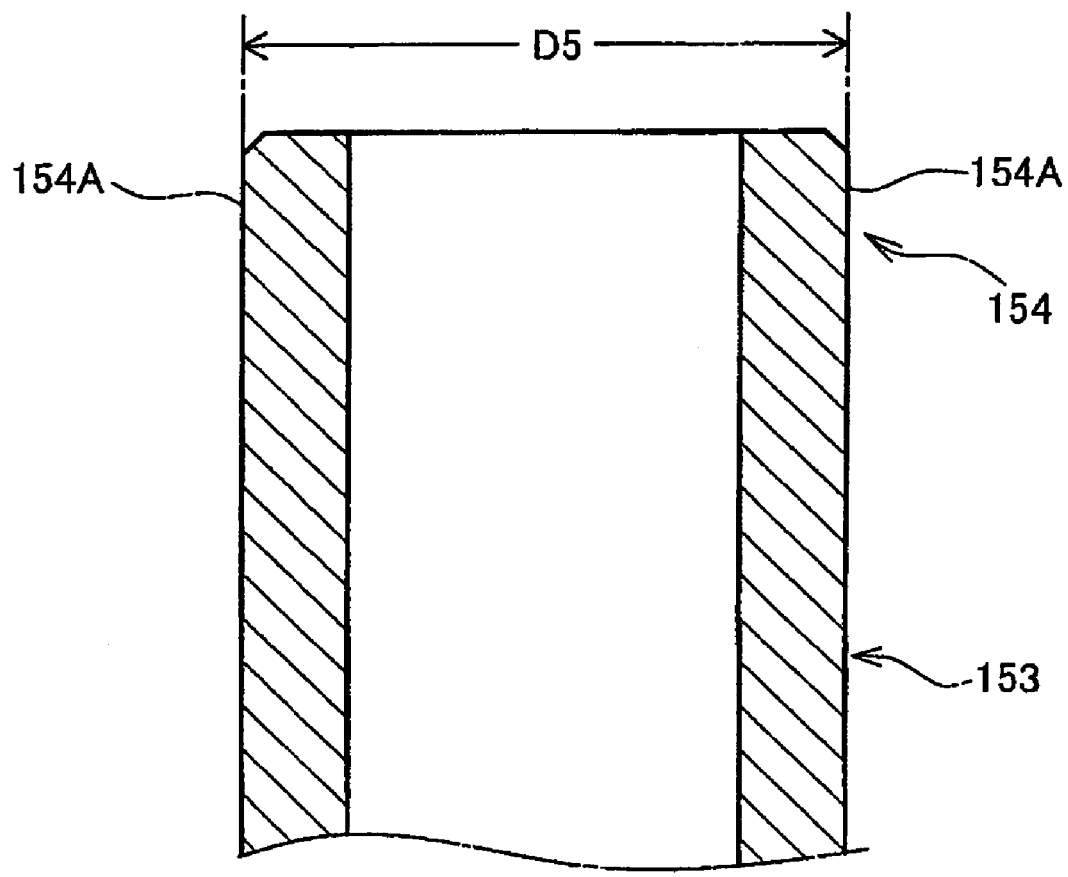

FIG.24
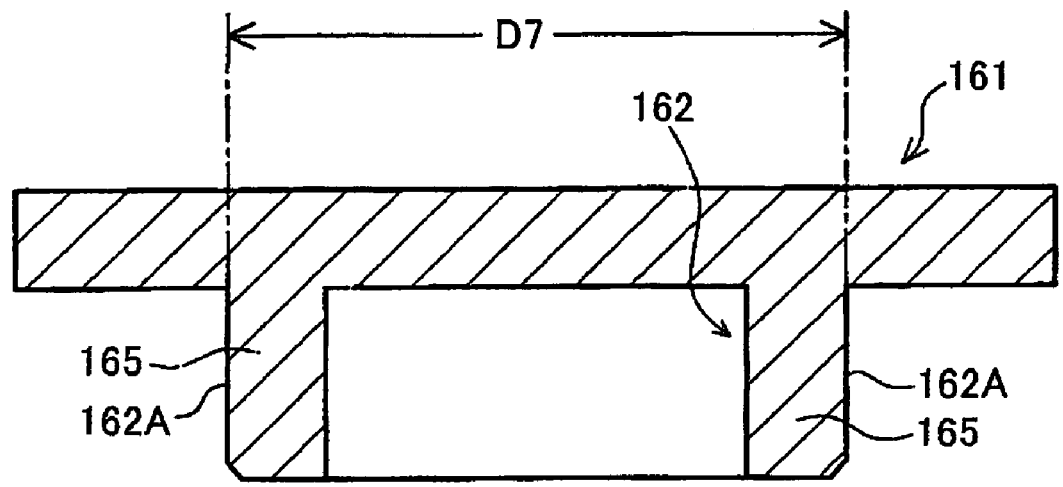
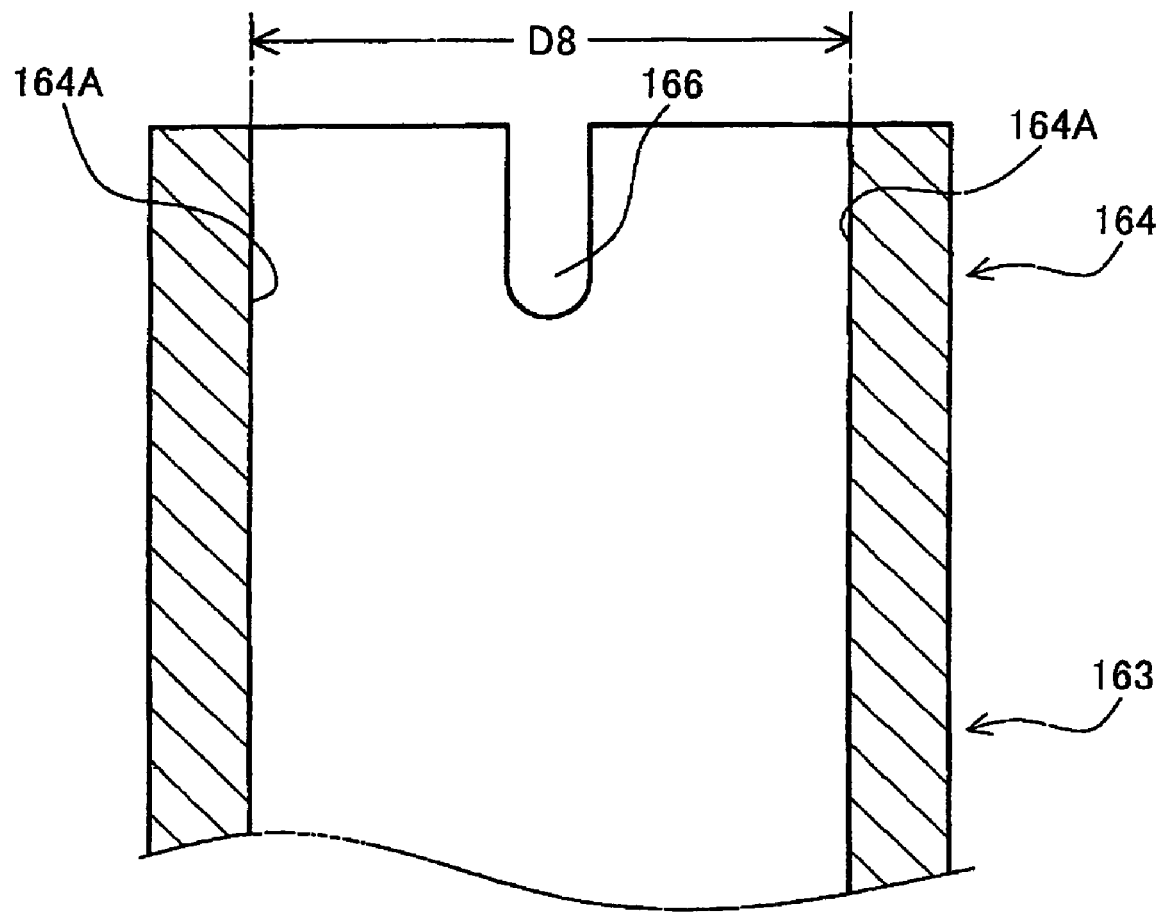

ROLLED-PRINT-MEDIUM HOLDER DEVICE

BACKGROUND OF THE INVENTION

1. Field of the Invention

The present invention relates to a holder device for rotatably holding a rolled print medium which is a long print medium wound into a roll.

2. Description of Related Art

A print device is known in the art in which printing is performed on a rolled print medium while the print medium is being conveyed by conveyor means such as a platen roller. The print medium could have any of a plurality of different widths. A rolled-print-medium holder device for rotatably holding the rolled print medium at a predetermined position is provided within such a print device.

The interior of the rolled-print-medium holder device is configured of a plurality of divided members for rotatably holding the print medium, and the holder device is formed by fixing together those members while the print medium is held therein. In such a case, ultrasonic welding is commonly used as the fixing method. The ultrasonic welding is a method of using the vibration of sound waves to adhere a composite resin or the like, by which frictional heat is generated in the workpiece instantaneously by powerful vibrations, to ensure that the connecting surfaces of the workpiece melt and adhere together One method of such fixing by ultrasonic welding is described in Japanese patent-application No. 2004-30752, which discloses a tape cartridge in which the degree of flatness of the outer peripheral surface of a reel hub can be ensured and in which magnetic tape can be suitably wound. With this method, melted resin can be prevented from flowing out onto the outer peripheral surface of a reel hub by forming an indented shape around the periphery of a welding rib that is formed on a weld surface of an upper reel, then ensuring that melted resin from the welding rib that melts during the ultrasonic welding is captured by the indented shape.

In this manner, conventional welding by ultrasonic welding involves melting a welding rib and connecting confronting surfaces of the two members that are to be fixed together, to weld them. Schematic views of the welding construction of a rolled-print-medium holder device created by such ultrasonic welding method are shown in FIGS. 25A through 25C.

As shown in FIG. 25A, when an axial member 201 having a circular cylindrical shape is to be welded to a holder member 200 in the conventional rolled-print-medium holder device, first of all, the axial member 201 is inserted and fitted into a space portion 203 formed by a circular cylindrical wall 202 that is formed in the holder member 200, up until leading end portions of welding ribs 205 and 206 that are formed on a leading end surface 204 thereof come into contact with a weld surface 207 of the holder member 200, as shown in FIG. 25A.

As shown in FIG. 25B, ultrasonic vibrations are subsequently applied thereto with the components in this inserted state, so that the leading end portions of each of the welding ribs 205 and 206 touching the weld surface 207 are melted by frictional heat. When that happens, the welding ribs 205 and 206 melt gradually, starting from peak portions thereof, to form melted resin portions 208 and 209 (FIG. 25C), and the melted resin portions 208 and 209 will fill the gaps between the welding ribs 205 and 206 and the weld surface 207.

Subsequently, as shown in FIG. 25C, the welding ribs 205 and 206 are completely melted, and the leading end surface 204 and the weld surface 207 are welded by the melted resin portions 208 and 209.

SUMMARY

However, only the leading end surface 204 and the weld surface 207 are welded together by the melted resin portions 208 and 209 in the rolled-print-medium holder device that utilizes the above-described welding method. When the axial member 201 is to be welded to the holder member 200 in such a construction, it is first necessary to insert the leading end of the axial member 201 into the space portion 203 formed by the circular cylindrical wall for positioning, whereby a gap 210 is formed between an outer peripheral surface 201A of the axial member 201 and a circular cylindrical wall 202A. During the molding of the resin, it is impossible to avoid slight dimensional errors, so the gap 210 could become unnecessarily large. If that should happen, the welding between just the leading end surface 204 and the weld surface 207 would not be sufficient to fix the axial member 201 in the plane direction (the lateral direction in FIGS. 25A through 25C), and thus there is a danger that the weld strength cannot be sufficiently guaranteed.

In view of the above-described drawbacks, it is an objective of the present invention to provide a rolled-print-medium holder device that can achieve dramatic improvement in the weld strength in the direction of insertion during the welding of an outer fitting portion and an inner fitting portion, by welding an outer peripheral portion of the inner fitting portion to the outer fitting portion. It is another objective of the present invention to provide a rolled-print-medium holder device that enables an increase in the weld area without increasing the volume of the welded portions, so that the weld strength can be improved and thus the welding can be performed in a shorter time, which improves the quality of the external appearance.

In order to attain the above and other objects, the present invention provides a rolled-print-medium holder device for rotatably holding a rolled print medium having a center hollow portion. The rolled-print-medium holder device includes an axial member, a holding member, an outer fitting portion, an inner fitting portion, and a weld portion. The axial member extends in an axial direction and has both axial ends. The axial member is inserted through the center hollow portion. The holding member is fixed to at least one of the both axial ends of the axial member and holds both sides of the rolled print medium. The outer fitting portion is provided at either one of the axial member and the holding member. The outer fitting portion has an inner peripheral surface. The inner fitting portion is provided at the other one of the axial member and the holding member. The inner fitting portion has an outer peripheral surface. The inner fitting portion is fitted into the outer fitting portion. The weld portion is provided at at least one of the inner fitting portion and the outer fitting portion. The weld portion at least fixes the outer peripheral surface to the inner peripheral surface by ultrasonic welding.

BRIEF DESCRIPTION OF THE DRAWINGS

The above and other objects, features and advantages of the invention will become more apparent from reading the following description of the embodiments taken in connection with the accompanying drawings in which:

FIG. 7 is a cross-sectional view showing the interior of the label printer according to the first embodiment, with the top cover removed;

FIG. 8 is an enlarged cross-sectional view for particularly showing a paper supply guide of the label printer according to the first embodiment;

FIG. 10A is a perspective view of the roll sheet holder according to the first embodiment;

FIG. 10B is a perspective view of the roll sheet holder according to the first embodiment;

FIG. 11A is a side view of a sheet holding member of the roll sheet holder according to the first embodiment, as viewed from the inner side of the roll sheet holder;

FIG. 11B is a rear view of the roll sheet holder according to the first embodiment;

FIG. 11C is a side view of a guide member of the roll sheet holder according to the first embodiment, as viewed from the inner side of the roll sheet holder;

FIG. 23 is a cross-sectional view of an outer fitting portion and an inner fitting portion of a roll sheet holder prior to welding according to a fifth embodiment of the present invention;

FIG. 24 is a cross-sectional view of an outer fitting portion and an inner fitting portion of a roll sheet holder prior to welding according to a sixth embodiment of the present invention;

DETAILED DESCRIPTION OF THE EMBODIMENTS

A rolled-print-medium holder device according to first through sixth embodiments of the present invention will be described while referring to the accompanying drawings.

First Embodiment

A rolled-print-medium holder device according to a first embodiment of the present invention will be described with reference to FIGS. 1 through 17C. The embodiment pertains to a roll sheet holder 3 installed in a label printer 1.

First, the basic construction of the label printer 1 in which is installed the roll sheet holder 3 will be described with reference to FIGS. 1 through 7.

Figure 1:
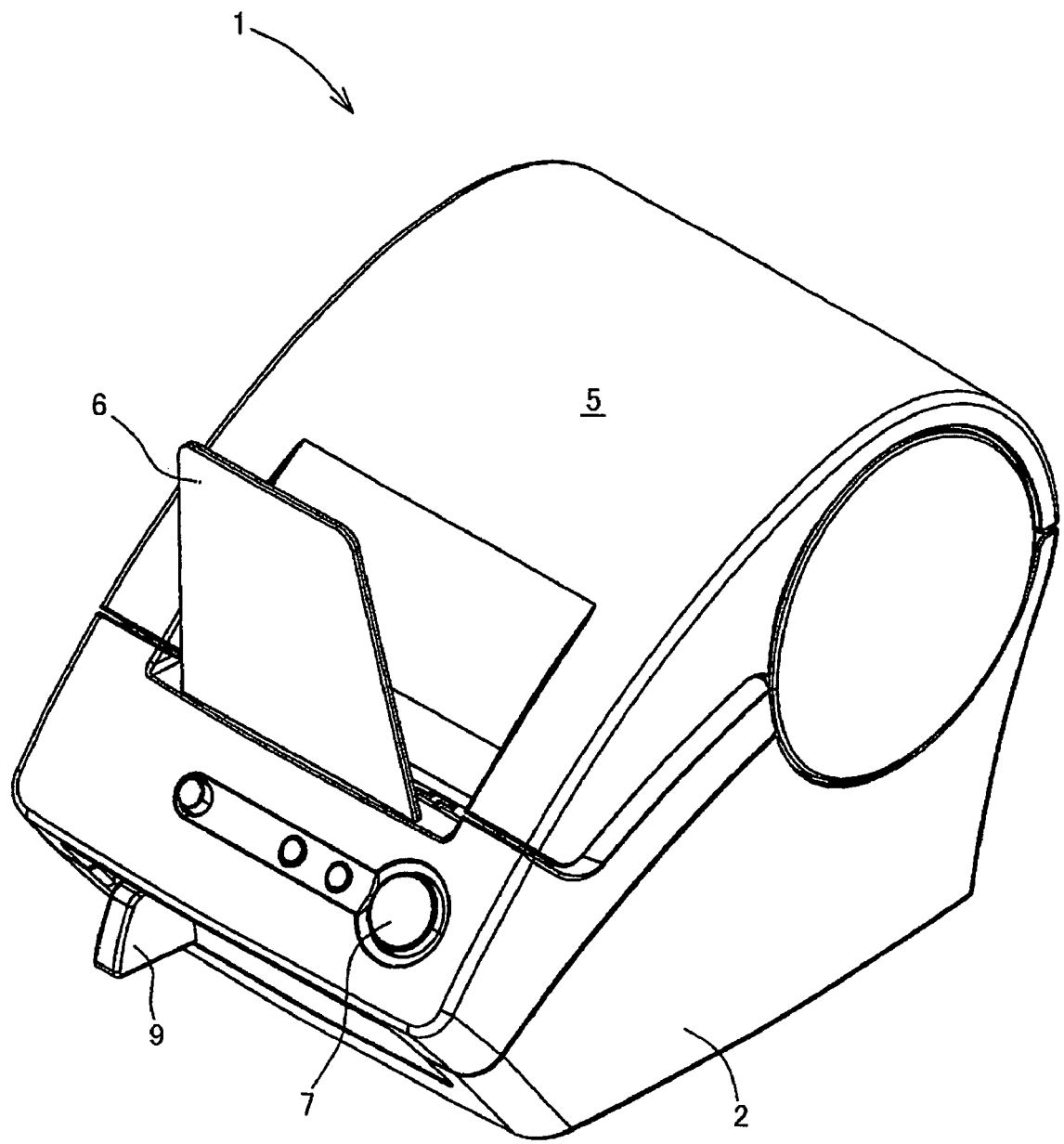
FIG. 1 is a perspective view of a label printer in which a roll sheet holder according to a first embodiment of the present invention is installed.
Figure 2:
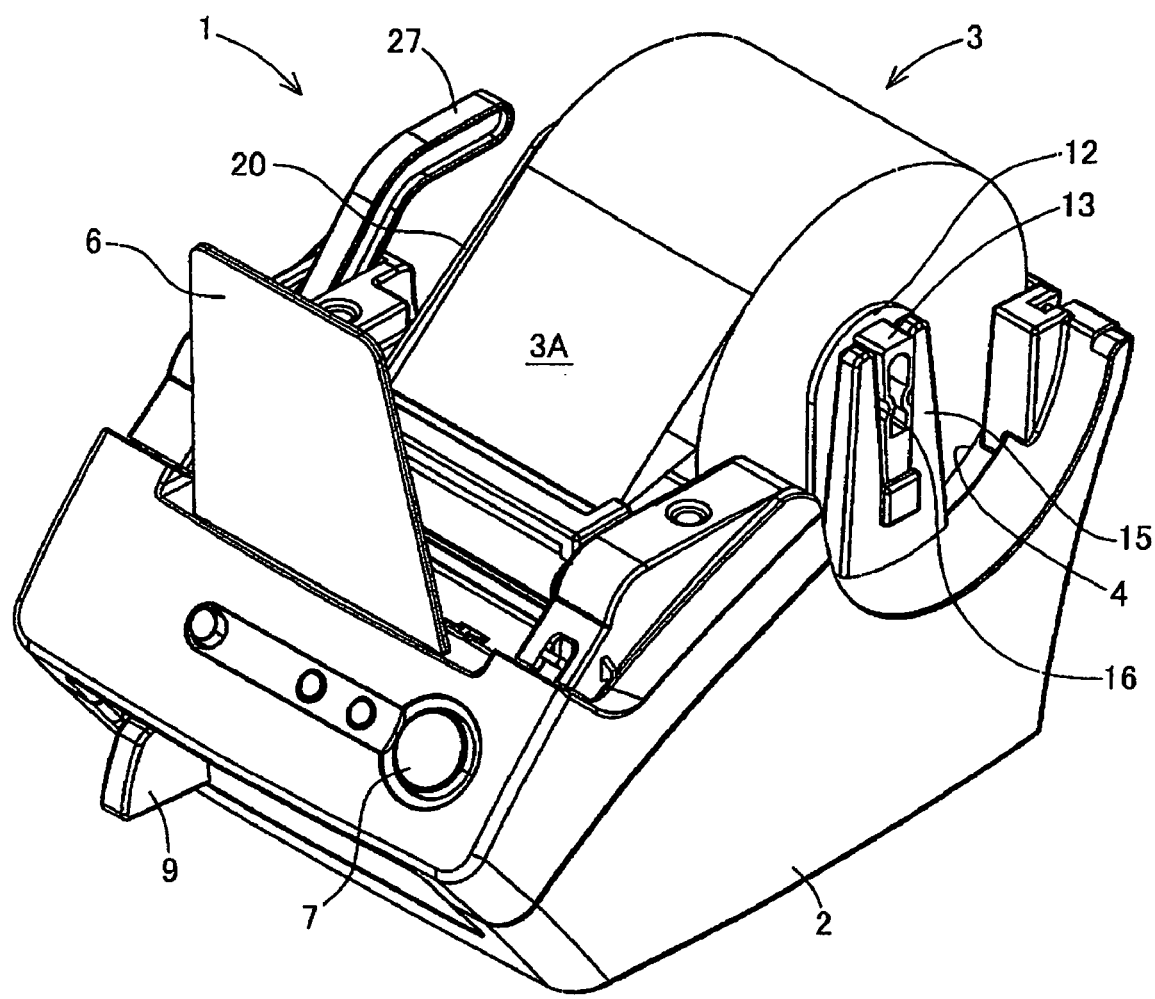
FIG. 2 is a perspective view of the label printer in a state in which the roll sheet holder according to the first embodiment is installed, with a top cover removed.
Figure 3:
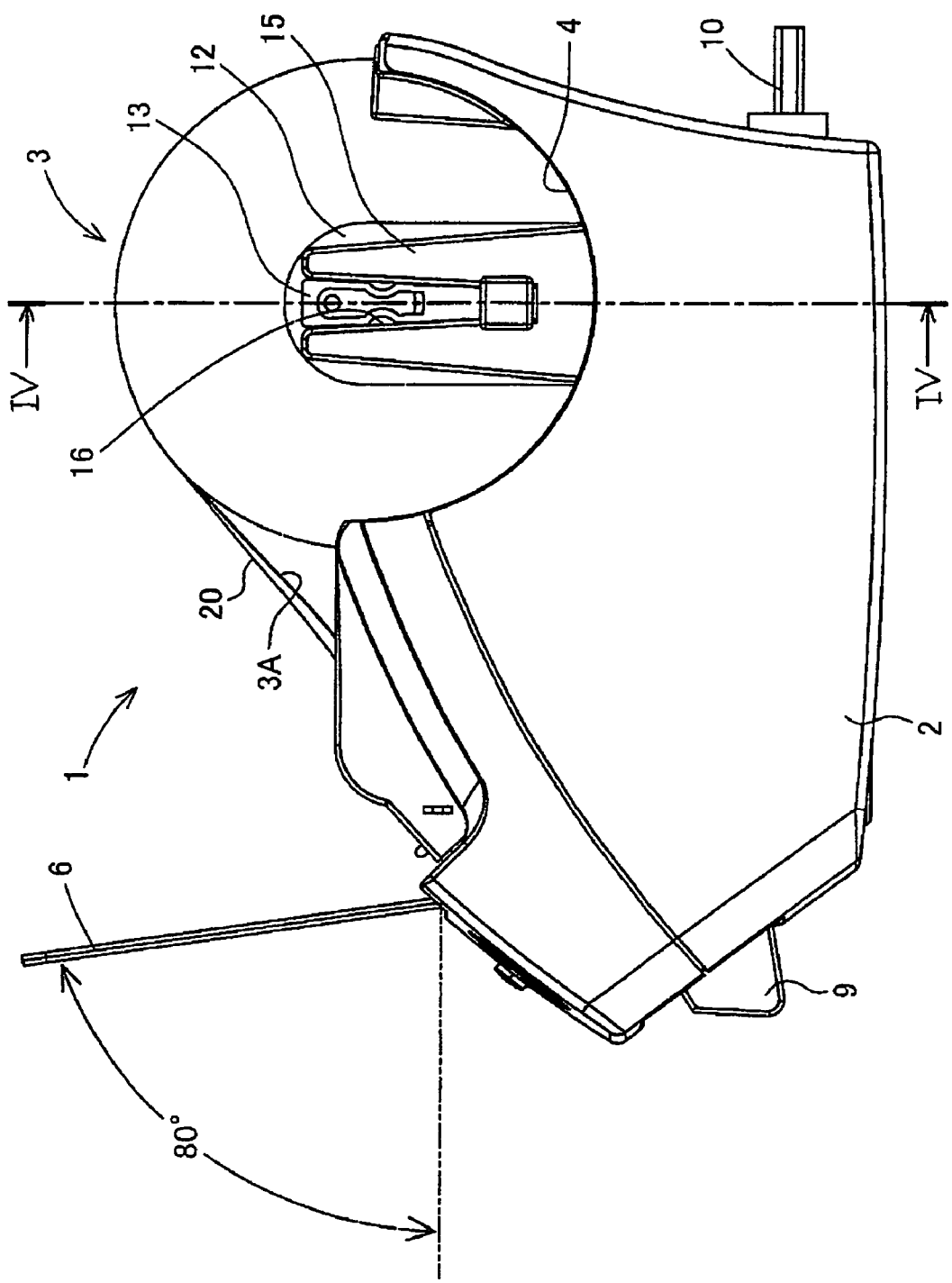
FIG. 3 is a side view of the label printer in the state in which the roll sheet holder according to the first embodiment is installed, with the top cover removed.

As shown in FIGS. 1 through 3, the label printer 1 includes a main casing 2; a top cover 5 made of transparent resin that is pivotally fixed to an upper end portion at the rear so as to open and close and to cover the upper side of a roll-sheet-holder receiving portion 4 in which is accommodated the roll sheet holder 3 having a roll sheet 3A of a predetermined width wound therearound; a tray 6 made of transparent resin that is erected so as to face a substantially central portion of the front side of the top cover 5; a power button 7 disposed on the front side of the tray 6; and a cutter lever 9 that causes a cutter unit 8 (FIG. 7) which is provided on the front lower surface in a laterally movable manner, to move to left and right.

A power cord 10 is connected to one side of the rear surface of the main casing 2 and also a connector 11 (FIG. 6) configured of a Universal Serial Bus (USB) socket for the connection of a personal computer or the like (not shown) is provided on the other side thereof.

Figure 4:
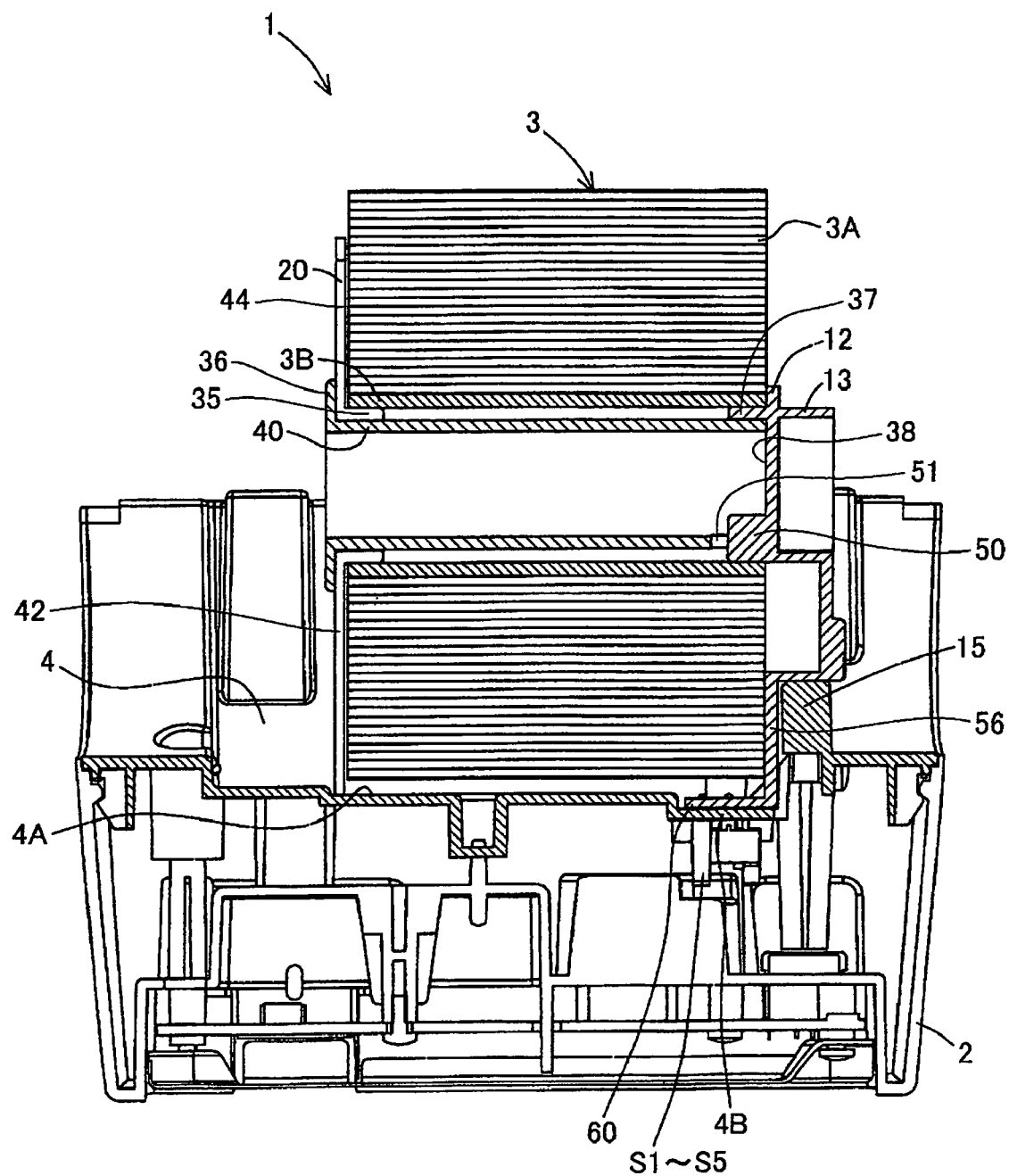
FIG. 4 is a cross-sectional view taken along a line IV-IV of FIG. 3.

The roll sheet 3A according to the first embodiment is configured of a long label sheet made of long heat-sensitive sheet (known as thermal paper) capable of self-coloring, onto one surface of which is pasted removable paper with adhesive therebetween. The roll sheet 3A is wound onto a roll-sheet core 3B having a center hollow portion (FIG. 4).

As shown in FIG. 3, the tray 6 is erected so as to form an angle of approximately 80° with respect to a plane that is parallel to the surface on which the label printer 1 is placed, which is shown by the two-dot chain line in FIG. 3. It should be noted, however, that the angle formed between the tray 6 and the plane parallel to the surface on which the label printer 1 is placed may be any angle between 60° and 90°. Instead of transparent resin, the tray 6 may also be formed by bending a metal wire into a U-shape, for example.

As shown in FIGS. 2 through 6, a holder support member 15 is provided on one side end portion of the label printer 1 (the left side end in FIG. 6), in a direction that is substantially perpendicular to the conveying direction of the roll-sheet-holder receiving portion 4.

A first positioning groove portion 16 is formed in the holder support member 15, in an upwardly opening deep U-shape as seen from the front thereof. As shown in FIGS. 2 and 3, the positional relationship of the roll sheet holder 3 in the main casing 2 can be determined by fitting an attachment portion 13, which protrudes towards the outside from a sheet holding member 12 that forms part of the roll sheet holder 3, into the first positioning groove portion 16.

A mounting portion 21 that extends substantially horizontally is formed from a rear end portion of an insertion port 18 through which the roll sheet 3A is inserted to an upper end portion of the front of the roll-sheet-holder receiving portion 4 (FIG. 7). A leading end portion of a guide member 20 that forms part of the roll sheet holder 3 is mounted on the mounting portion 21.

Four second positioning groove portions 22A through 22D of a substantially L-shaped section are formed in an angled edge of the rear of the mounting portion 21 in the conveying direction, to correspond to a plurality of possible widthwise dimensions of the roll sheet 3A. As shown in FIG. 7, each of the second positioning groove portions 22A to 22D is formed such that part of the guide member 20 that forms part of the roll sheet holder 3 can be inserted therein from above. It should be noted, however, that the leading end portion of the guide member 20 that forms part of the roll sheet holder 3 extends as far as the insertion port 18.

Figure 5:
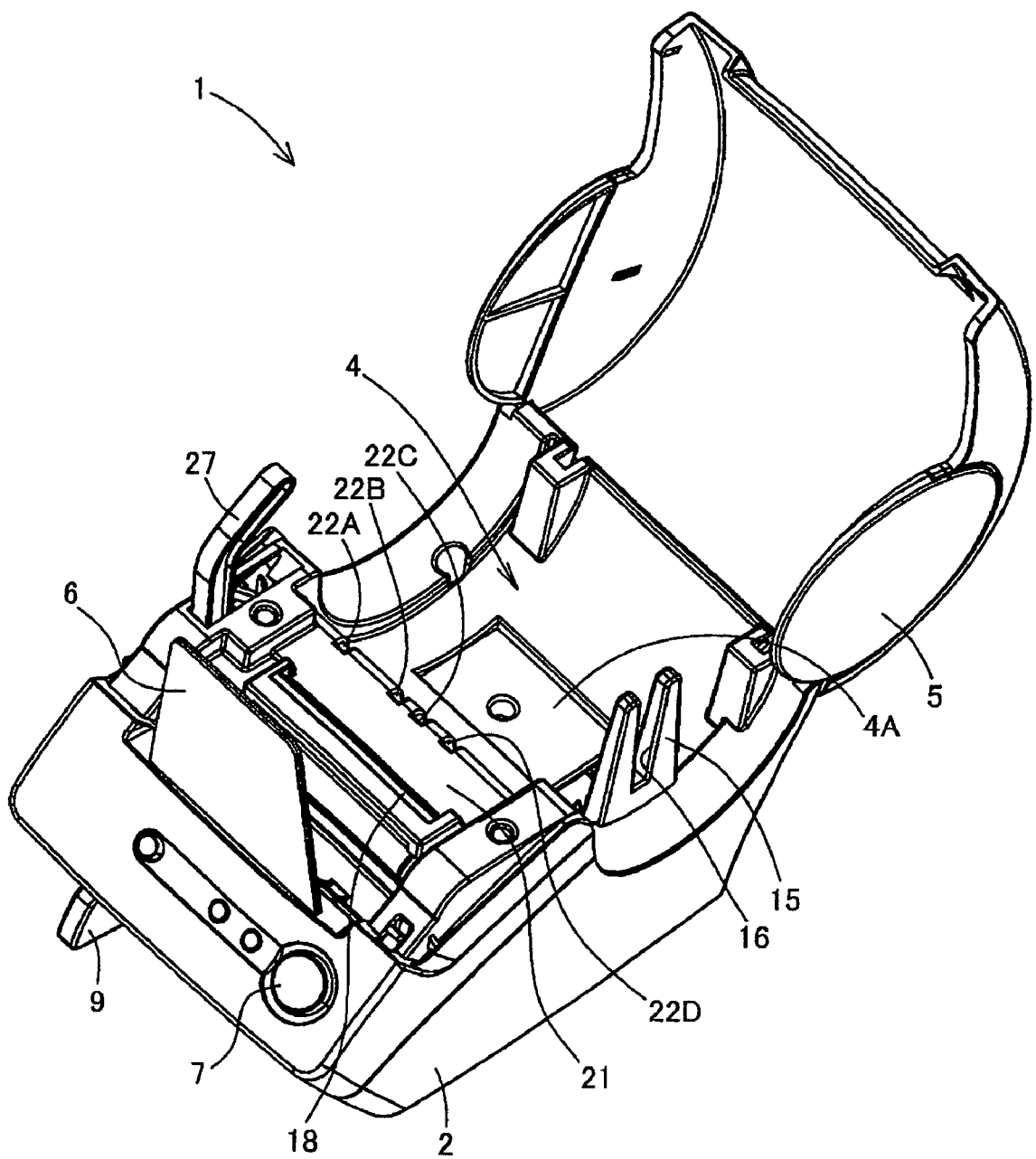
FIG. 5 is a perspective view of the label printer according to the first embodiment, with the top cover opened.
Figure 6:
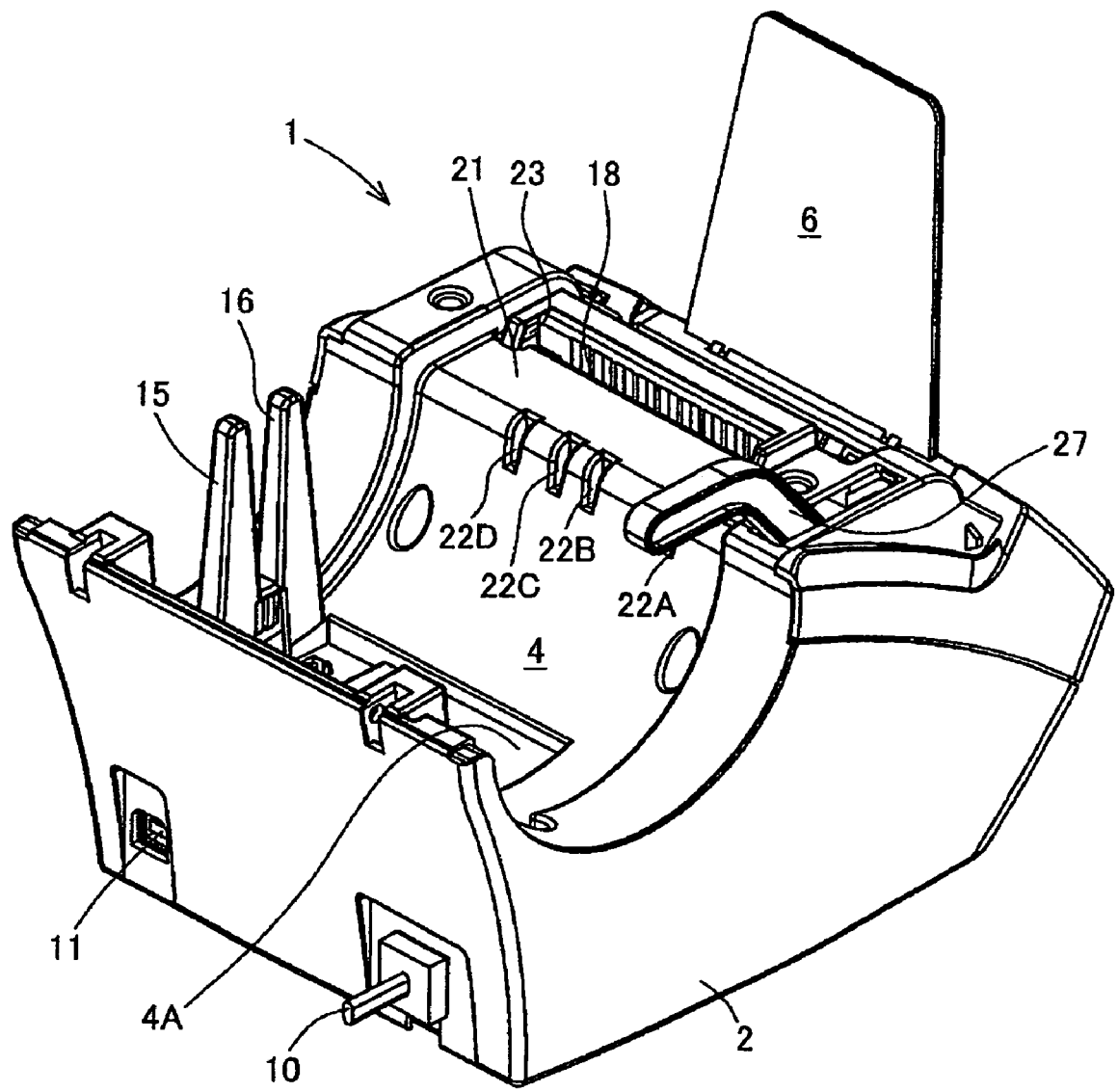
FIG. 6 is a perspective view as viewed from the rear of the label printer according to the first embodiment, with the top cover removed.

As shown in FIGS. 5 and 6, a positioning indentation 4A of a rectangular shape in plan view is formed to a predetermined depth (of approximately 1.5 to 3 mm (millimeter) in the first embodiment) in a base surface portion of the roll-sheet-holder receiving portion 4. The positioning indentation 4A is formed to have a length from an inner base portion of the holder support member 15 up to a position confronting the second positioning groove portion 22A, and the widthwise dimension of the positioning indentation 4A in the conveying direction is formed to be substantially equal to the widthwise direction of the lower edges of each of the sheet holding member 12 (FIG. 3) and the guide member 20 (FIG. 7).

As shown in FIG. 4, an identification indentation 4B is formed in an inner base edge of the holder support member 15 of the positioning indentation 4A. The identification indentation 4B is formed to a predetermined depth that is greater than the width of the positioning indentation 4A (by approximately 1.5 to 3 mm in the first embodiment), to form a portion at which is placed a sheet identification portion 60 (which will be described later with reference to FIG. 10) that extends out in the inward direction at substantially right angles from a lower end portion of the sheet holding member 12.

As shown in FIG. 4, L-shaped sheet identification sensors S1, S2, S3, S4, and S5 for identifying the type of the roll sheet 3A are provided in the identification indentation 4B. Each of the sheet identification sensors S1 through S5 consists of a known mechanical switch including a plunger and microswitch or the like. The sensors S1 through S5 detect the presence or absence of sensor holes 60A (which will be described later with reference to FIG. 9) of the sheet identification portion 60 that correspond to the sheet identification sensors S1 through S5, so that the type of the roll sheet 3A mounted in the roll sheet holder 3 can be detected by on/off signals therefrom.

As shown in FIG. 6, a guide piece 23 is erected from the insertion port 18 on a side at which the holder support member 15 is positioned (on the left side in FIG. 6). Since the inner side surface of the guide piece 23 is formed to be positioned at the same position in the widthwise direction as the inner end surface of the sheet holding member 12 that is fitted into the holder support member 15, displacement in the widthwise direction during the conveying of the roll sheet 3A can be restricted.

As shown in FIG. 5, a lever 27 that moves a thermal head 31 (FIG. 7) up and down is provided on the other side edge of the roll-sheet-holder receiving portion 4 (the upper end shown in FIG. 5). In other words, the thermal head 31 can be moved downward and separated from a platen roller 26 (FIG. 7) by turning the lever 27 upward, and the thermal head 31 can be moved upward to press the roll sheet 3A against the platen roller 26 to enable printing by turning the lever 27 downward. Control circuitry (not shown) that controls the driving of the mechanical parts in accordance with instructions from an external personal computer or the like is provided in the lower part of the roll-sheet-holder receiving portion 4. Controlling the driving of the thermal head 31 while rotating the platen roller 26 by a stepping motor or the like (not shown) ensures that image data can be printed sequentially on the print surface while the roll sheet 3A is conveyed. The roll sheet 3A that has been discharged onto the tray 6 is then cut off by the cutter unit 8.

As shown in FIG. 7, a paper supply guide 32 is provided between the insertion port 18 and the platen roller 26 to guide the roll sheet 3A that has been inserted through the insertion port 18 towards the platen roller 26. FIG. 8 is an enlarged cross-sectional view showing the vicinity of the paper supply guide in FIG. 7.

As shown in FIG. 8, the paper supply guide 32 is disposed between the insertion port 18 and the platen roller 26, and a curved surface 32A for contacting with the roll sheet 3A is formed in a lower portion thereof. The roll sheet 3A that has been inserted from the insertion port 18 along a conveying path 33 formed by the curved surface 32A and the mounting portion 21 is guided towards the platen roller 26. The roll sheet 3A that has been guided to the platen roller 26 is then printed upon by the thermal head 31 and is discharged from the casing.

The paper supply guide 32 according to the first embodiment is formed of a composite resin and is also plated with copper on the surface thereof. One end of the thus-plated paper supply guide 32 is grounded electrically. In this case, any electrostatic charge on the roll sheet 3A can be removed by the paper supply guide 32 when electrostatically charged roll sheet 3A is conveyed in or when the electrostatic charge is generated in the roll sheet 3A during the conveying, by plating the paper supply guide 32 with copper and also grounding the paper supply guide 32. Since the paper supply guide 32 is provided adjacent to the platen roller 26, any electrostatic charge that may be generated on the surface of the platen roller 26 can be similarly removed.

There is therefore no danger of adverse effects on the thermal head 31 or the control board (not shown) due to generated electrostatic charges, which can prevent problems during printing.

Next, the general construction of the roll sheet holder 3 will be described with reference to FIGS. 9A through 12B.

As shown in FIGS. 9A through 12B, the roll sheet holder 3 is configured of the roll sheet 3A that is wound around the roll-sheet core 3B that acts as a winding shaft in a cylindrical form; an holder axial member 40 which is inserted through the roll-sheet core 3B and the guide member 20 (FIG. 12A) to rotatably hold the roll sheet 3A and which also has a flange portion 36 that restricts motion in the widthwise direction of the guide member 20; the guide member 20 that has a first cylindrical portion 35 through which is inserted the end of the holder axial member 40 provided with the flange portion 36; and the sheet holding member 12 having a second cylindrical portion 37 through which the other end of the holder axial member 40 is inserted and connected thereto. Each of the sheet holding member 12, the guide member 20, and the holder axial member 40 are made of a composite resin.

The roll-sheet core 3B around which the roll sheet 3A is wound is a cylindrical member having a diameter that is slightly larger than the outer diameters of the first cylindrical portion 35 of the guide member 20 and the second cylindrical portion 37 of the sheet holding member 12, which has the same diameter as the first cylindrical portion 35. Since the first cylindrical portion 35 and the second cylindrical portion 37 are inserted into the corresponding two ends of the roll-sheet core 3B, the roll-sheet core 3B and the roll sheet 3A can be rotatably held thereby.

Figure 13:
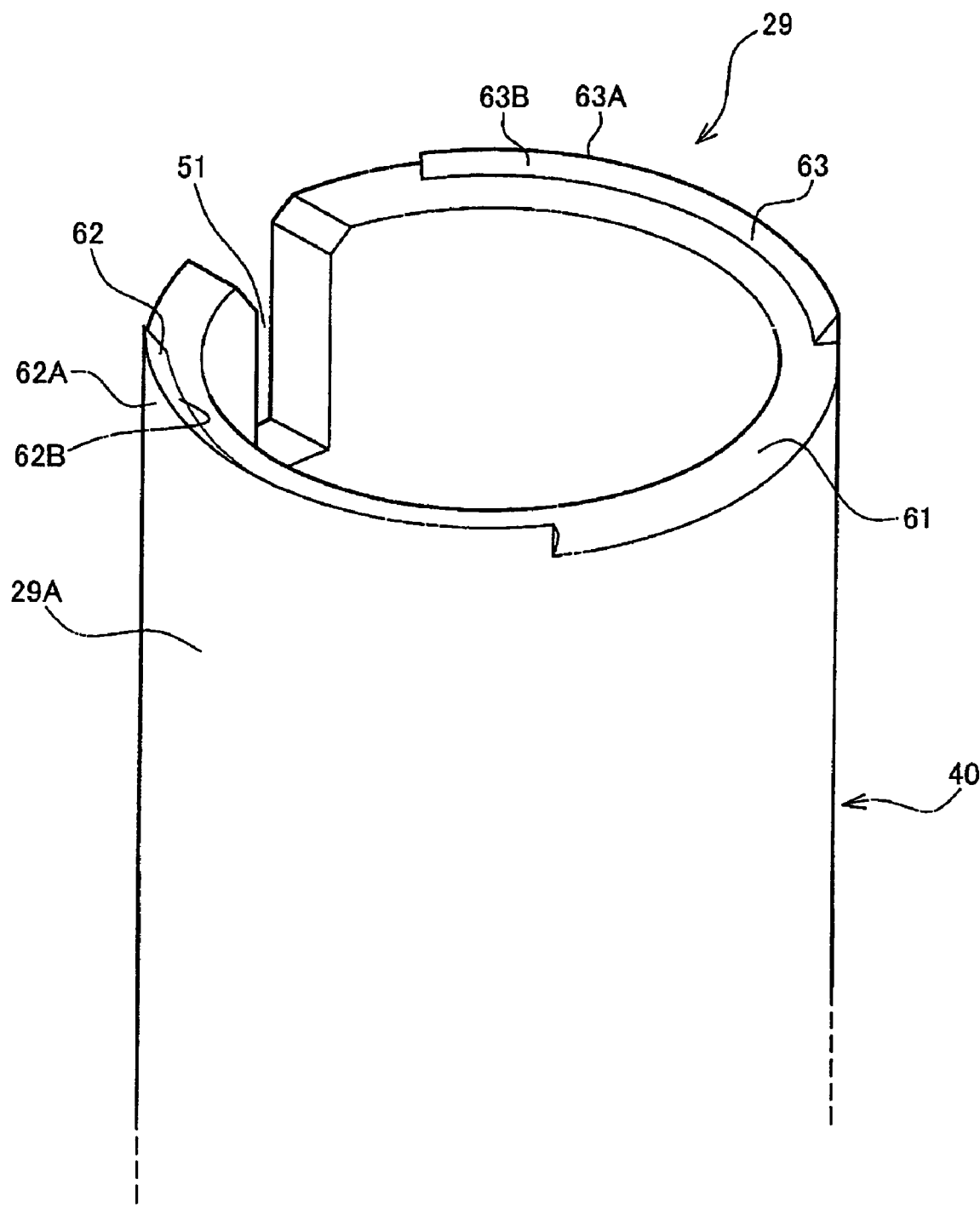
FIG. 13 is a perspective view for particularly showing an inner fitting portion of the holder axial member prior to welding according to the first embodiment.

The holder axial member 40 is a cylindrical member that has a diameter that is smaller than the inner diameter of the first cylindrical portion 35 and the second cylindrical portion 37. The flange portion 36 is formed on an end portion on the guide member 20 side of the holder axial member 40, whereas the end portion on the sheet holding member 12 side thereof is provided with an inner fitting portion 29 that is fitted into an outer fitting portion 28 formed on the sheet holding member 12. A cutout portion 51 is formed in the inner fitting portion 29 along the axial direction (FIG. 13).

The holder axial member 40 is passed through the guide member 20, and also the first cylindrical portion 35 that is inserted into the roll-sheet core 3B is formed on the inner surface of the guide member 20. The first cylindrical portion 35 is a cylinder having an outer diameter that is smaller than the inner diameter of the roll-sheet core 3B and an inner diameter that is greater than the outer diameter of the holder axial member 40.

A first extended portion 42 is formed to extend downward from the outer periphery on the lower side of the first cylindrical portion 35. The first extended portion 42 is inserted into the positioning indentation 4A formed on the base surface of the roll-sheet-holder receiving portion 4, in contact with the base surface of the positioning indentation 4A.

Figure 9A:
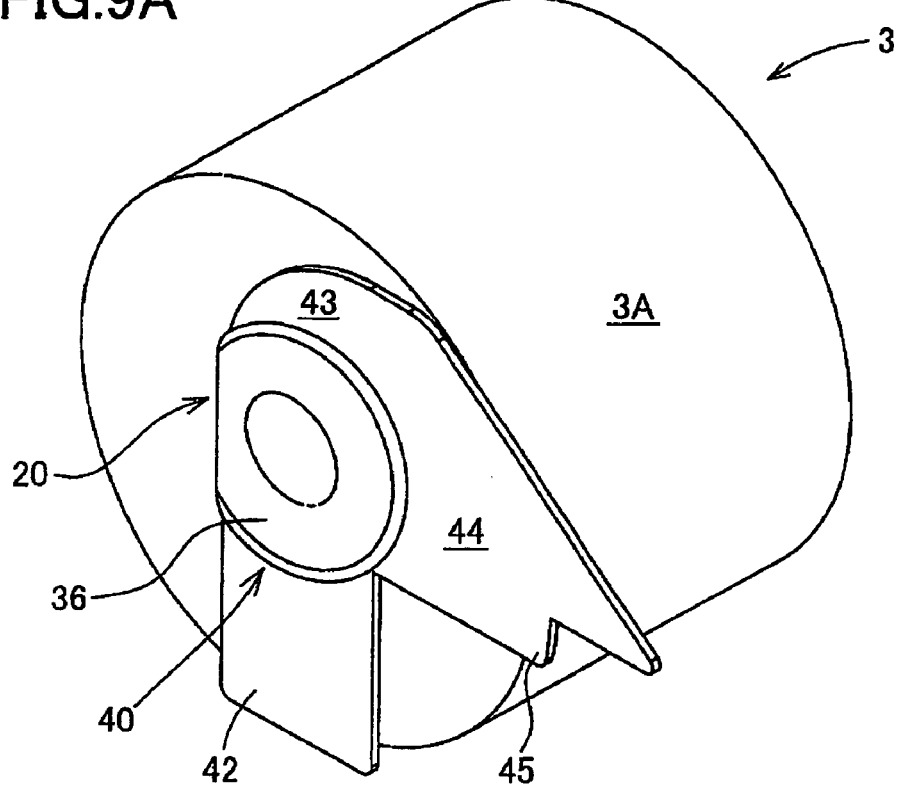
FIG. 9A is a perspective view as viewed from a top of the roll sheet holder with a roll sheet according to the first embodiment.
Figure 9B:
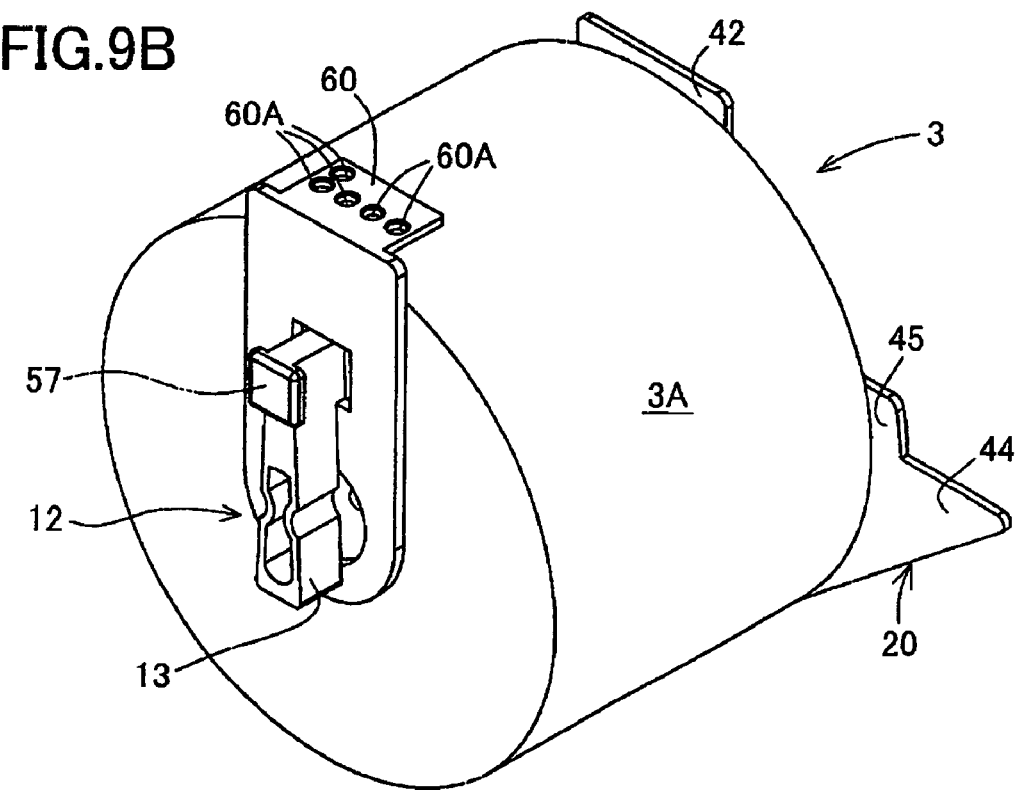
FIG. 9B is a perspective view as viewed from a bottom of the roll sheet holder with the roll sheet according to the first embodiment.
Figure 12A:
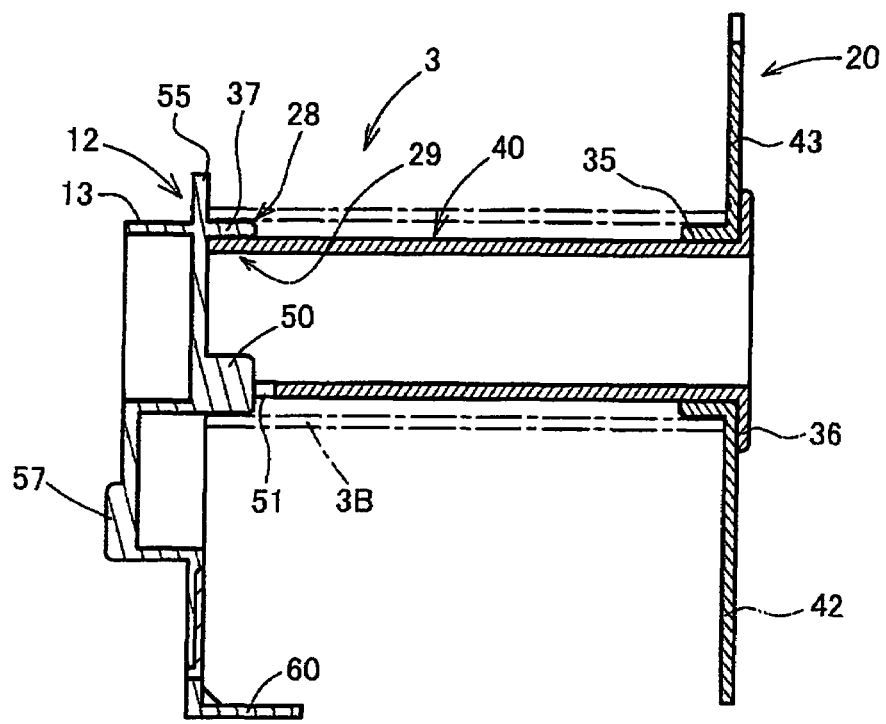
FIG. 12A is a vertical cross-sectional view through an axial center of a holder axial member, taken along a line XIIA-XIIA of FIG. 10A.
Figure 12B:
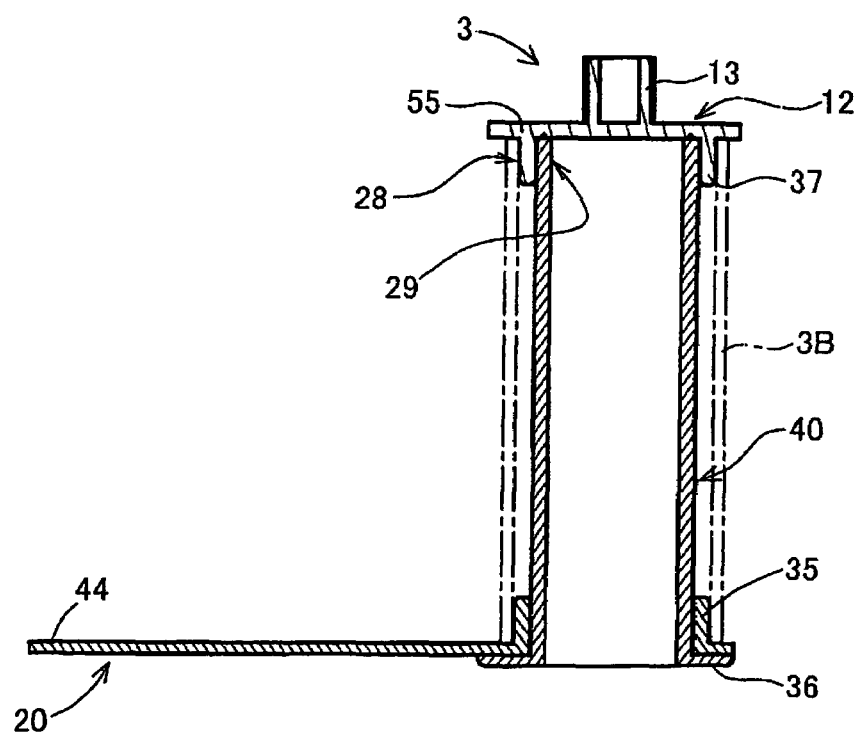
FIG. 12B is a horizontal cross-sectional view through the axial center of the holder axial member, taken along a line XIIB-XIIB of FIG. 10A.

As shown in FIG. 9A, a second extended portion 43 is formed on the guide member 20 to extend outward so as to cover a substantially ¼ portion of the outer end surface of the roll sheet 3A in the forward direction. A third extended portion 44 with an upper edge that extends forward and downward to the vicinity of the insertion port 18 (FIG. 6) is formed from the outer periphery of the second extended portion 43. The lower surface of the leading edge of the third extended portion 44 is formed to be substantially horizontal, and is configured to guide one side edge of the roll sheet 3A to the insertion port 18 by contacting the mounting portion 21 of the label printer 1.

As shown in FIG. 10B, a fourth extended portion 45 is formed on the lower end of the third extended portion 44, to extend a predetermined length from a position near the rear end in the conveying direction to the first extended portion 42. The lower end surface of the third extended portion 44 is configured such that the leading edge of the fourth extended portion 45 fits into one of the second positioning groove portions 22A to 22D that correspond to different widths of the roll sheet 3A that can be mounted, when in contact with the mounting portion 21 (FIG. 7).

Figure 15:
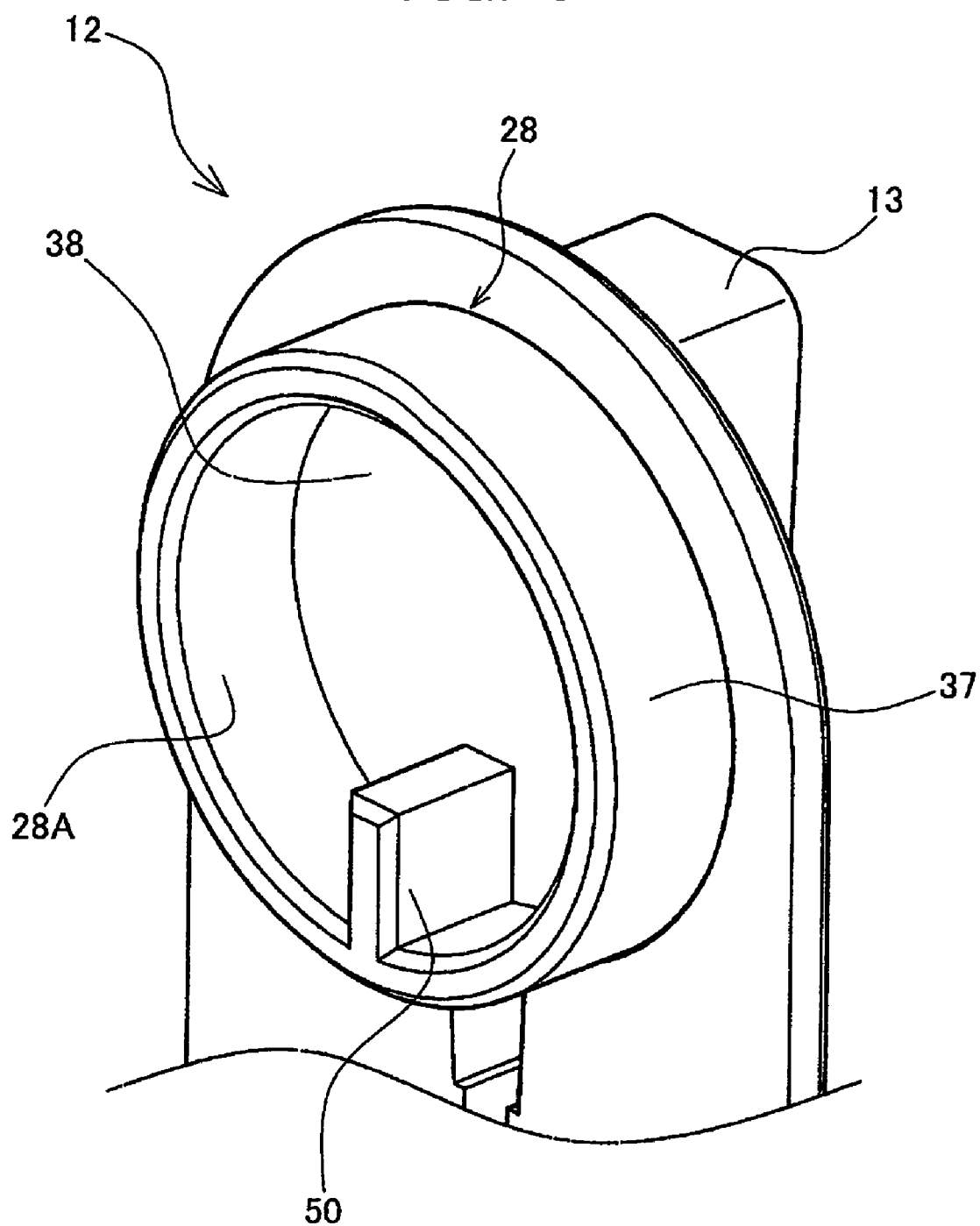
FIG. 15 is a perspective view for particularly showing an outer fitting portion of the sheet holding member prior to the welding according to the first embodiment.

As shown in FIG. 15, the outer fitting portion 28 that is fitted over the inner fitting portion 29 formed on the leading end of the holder axial member 40 is formed on the sheet holding member 12. The outer fitting portion 28 is configured of the second cylindrical portion 37, which is formed in a substantially circular shape to correspond to the shape of the leading end of the holder axial member 40, and an inner end surface 38 that is defined in a circle by the second cylindrical portion 37. The inner diameter of the second cylindrical portion 37 is 0.05 mm to 0.10 mm greater than the outer diameter of the holder axial member 40. A positioning rib 50 is provided to protrude from a lower end portion within the second cylindrical portion 37. The insertion of the positioning rib 50 into the cutout portion 51 can position the sheet holding member 12 and the guide member 20 via the holder axial member 40, thus determining the size of the roll sheet holder 3 in the widthwise direction. The holder axial member 40 is fixed to the sheet holding member 12 by ultrasonic welding in a manner that will be described later, after the leading end portion of the holder axial member 40 and the second cylindrical portion 37 have been connected.

As shown in FIGS. 10A and 10B, the outer end surface of the second cylindrical portion 37 is blocked by the sheet holding member 12 and an extended portion 56 is formed to extend downward from the second cylindrical portion 37. The inner surface of the extended portion 56 is in contact with the outer end surfaces of the roll sheet 3A and the roll-sheet core 3B (FIG. 4).

The attachment portion 13 of a substantially elongated rectangular shape in cross section protrudes from a substantially central portion in the lateral direction of the outer end surface of the extended portion 56, as described previously. The attachment portion 13 is formed to become narrower in the downward direction, as seen from the front (FIG. 2), and is capable of locking into the first positioning groove portion 16 of the label printer 1. The length of protrusion of the attachment portion 13 is substantially equal to the length of the first positioning groove portion 16.

The sheet identification portion 60 is formed of a substantially rectangular shape that is bent inward on a lower end portion of the extended portion 56 of the sheet holding member 12 and also protrudes downward by a predetermined length (of approximately 1 mm to 2.5 mm in the first embodiment) further than the lower end portion of the guide member 20.

The sensor holes 60A are formed in the sheet identification portion 60 at predetermined positions confronting the sheet identification sensors S1 through S5, as will be described later. Note that although five of the sensor holes 60A are formed in FIG. 9B, those sensor holes 60A are formed at predetermined positions that correspond to different widths of the mounted roll sheet 3A.

The roll-sheet core 3B on which the roll sheet 3A is wound is held rotatably by the first cylindrical portion 35 and the second cylindrical portion 37. Note that holder axial members 40 having a plurality of different lengths are provided, to correspond to each possible length of the roll-sheet core 3B.

The weld construction between the holder axial member 40 and the sheet holding member 12 will be described with reference to FIGS. 13 through 17C. In this case, the roll sheet holder 3 according to the first embodiment uses ultrasonic welding to fix the components after the inner fitting portion 29 provided at the holder axial member 40 is fitted into the outer fitting portion 28 provided at the sheet holding member 12.

Figure 14:
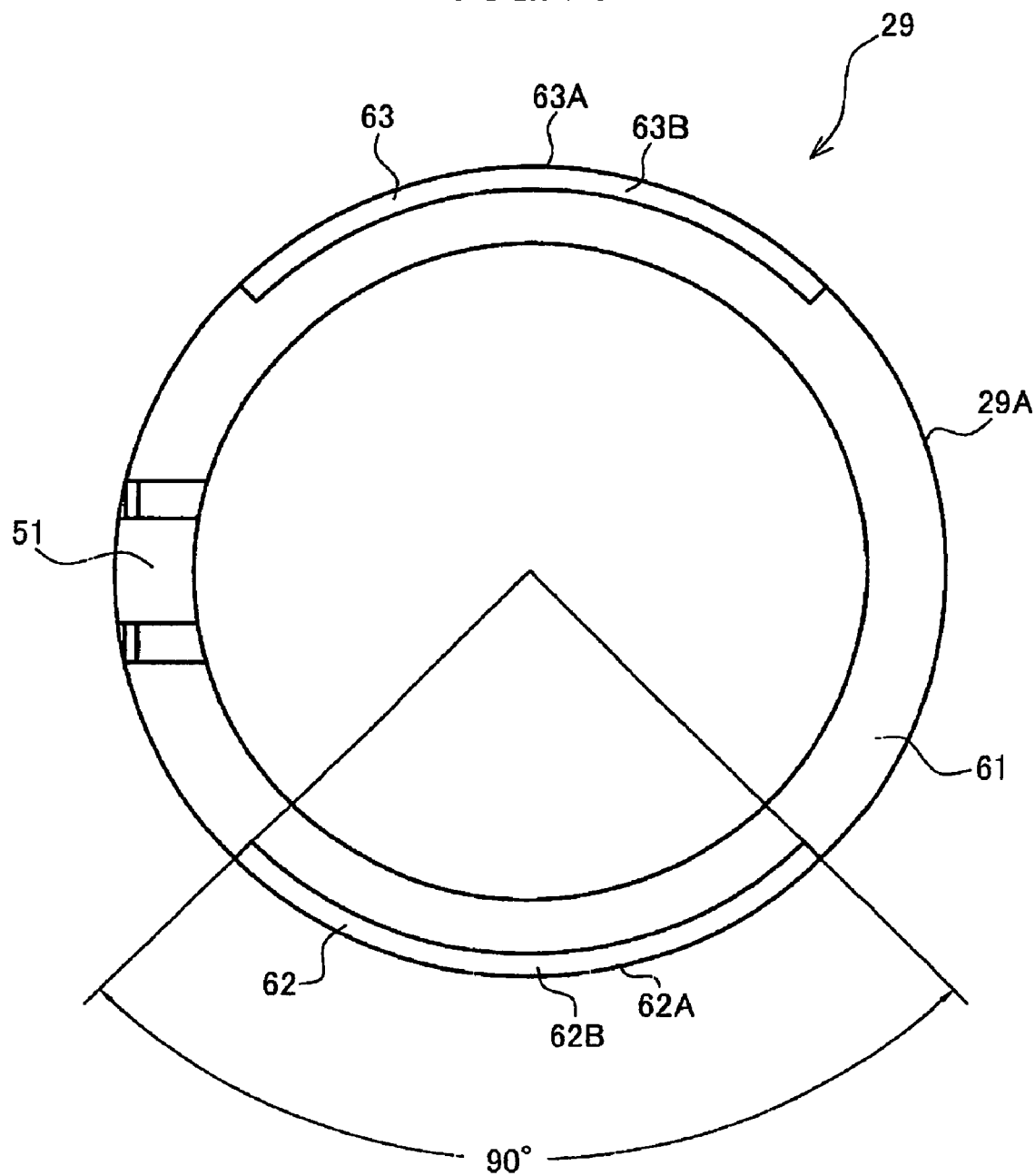
FIG. 14 is a plan view for particularly showing the inner fitting portion of the holder axial member prior to the welding according to the first embodiment.

The description first relates to the inner fitting portion 29 provided on the leading end portion of the holder axial member 40 prior to the welding, with reference to FIGS. 13 and 14. FIG. 13 is a perspective view that particularly shows the inner fitting portion 29 of the holder axial member 40 prior to the welding. FIG. 14 is a plan view that particularly shows the inner fitting portion 29 of the holder axial member 40 prior to the welding.

As shown in FIGS. 13 and 14, the inner fitting portion 29 is provided on the leading end portion of the holder axial member 40. The inner fitting portion 29 is configured by the leading end portion that is formed continuously from the holder axial member 40, and welding ribs 62 and 63 are formed to protrude from a confronting surface 61 that confronts the sheet holding member 12 (or more specifically, confronts the inner end surface 38). The welding ribs 62 and 63 are formed integrally with the holder axial member 40 in an arc shape that follows the outer periphery of the confronting surface 61 and are each disposed to cover a 90° angle (FIG. 14). The cutout portion 51 is formed between the welding ribs 62 and 63.

Figure 16:
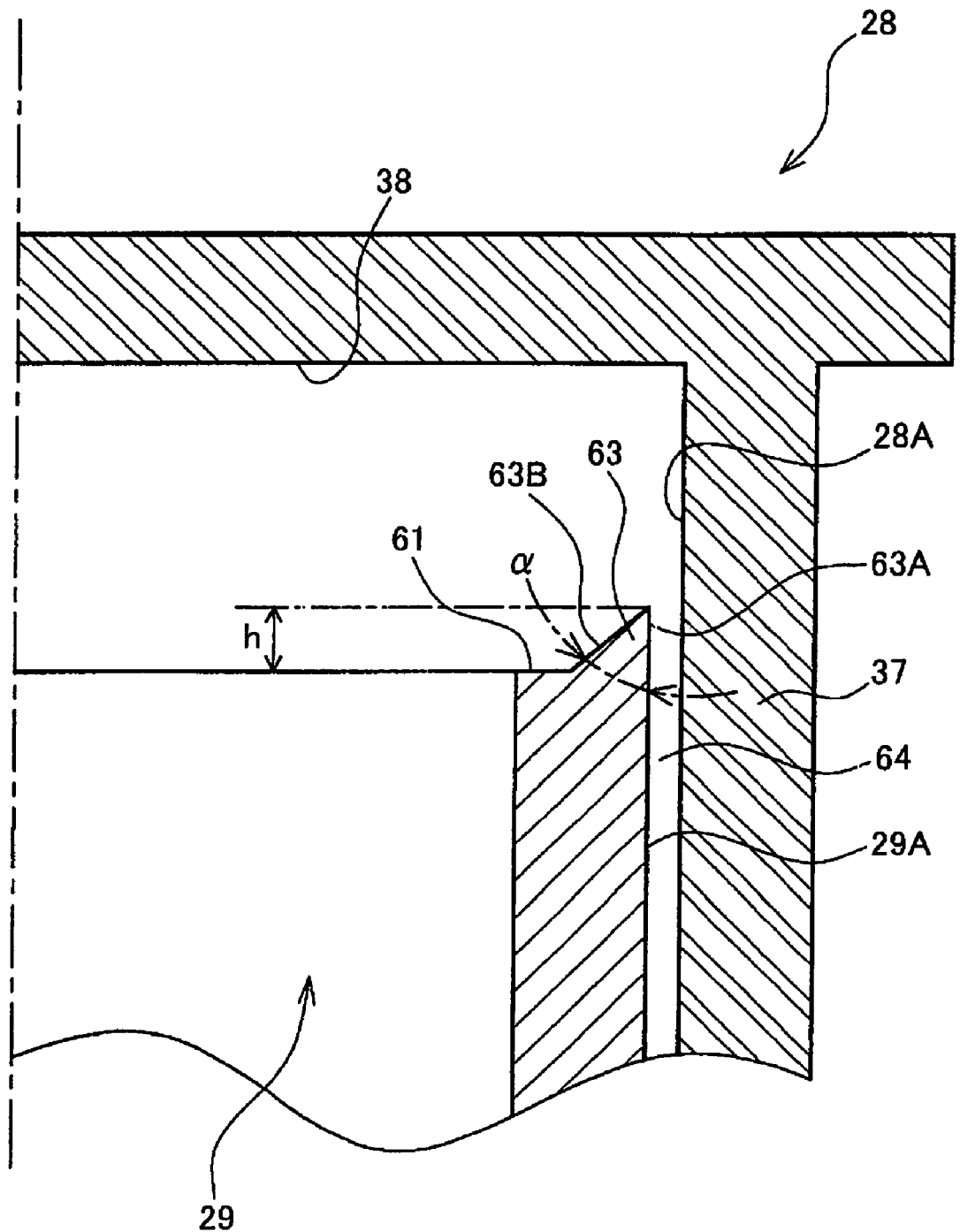
FIG. 16 is an enlarged cross-sectional view of the outer fitting portion and the inner fitting portion of the roll sheet holder during an insertion process according to the first embodiment.

Each of the welding ribs 62 and 63 is formed of two surfaces that together form a substantially right-angled triangle in section: an outer side surface 62A or 63A that is formed in the axial direction continuously from the outer peripheral surface of the holder axial member 40 and a slanted surface 62B or 63B that forms a predetermined angle α (50° in the first embodiment) with the corresponding outer side surface 62A or 63A (FIG. 16). As shown in FIG. 16, the height h of the welding ribs 62 and 63 from the confronting surface 61 is 0.5 mm to 0.6 mm. Accordingly, the welding is performed with welding ribs 62 and 63 having a suitable volume, by ensuring that the height of the welding ribs 62 and 63 is 0.5 mm to 0.6 mm, so that the weld strength can be improved. There is therefore no adverse effect on the components due to excessive welding time, which improves the quality of the external appearance.

The pre-welding construction of the outer fitting portion 28 provided on the sheet holding member 12 will be described with reference to FIG. 15. FIG. 15 is a perspective view that particularly shows the vicinity of the sheet holding member 12 prior to the welding.

As shown in FIG. 15, the outer fitting portion 28 is formed on an inner flat portion of the sheet holding member 12. The outer fitting portion 28 is configured of the second cylindrical portion 37 into which the inner fitting portion 29 is inserted (fitted) and the inner end surface 38 that is defined in a substantially circular shape by the second cylindrical portion 37.

The second cylindrical portion 37 is formed to follow the shape of the outer fitting portion 28 of the holder axial member 40, and the inner diameter of the second cylindrical portion 37 is 0.05 mm to 0.10 mm greater than the outer diameter of the holder axial member 40 that has the inner fitting portion 29. As shown in FIG. 16, when the inner fitting portion 29 is fitted in the outer fitting portion 28, therefore, a gap 64 (of a spacing d=0.025 mm to 0.050 mm) is formed between an outer peripheral surface 29A of the inner fitting portion 29 and an inner peripheral surface 28A of the outer fitting portion 28 (the inner peripheral surface of the second cylindrical portion 37).

In addition, as shown in FIG. 15, the positioning rib 50 protrudes at a lower end portion on the inner side of the second cylindrical portion 37. The sheet holding member 12 and the guide member 20 can be positioned with the holder axial member 40 therebetween by inserting the positioning rib 50 into the cutout portion 51 of the holder axial member 40.

Figure 17A:
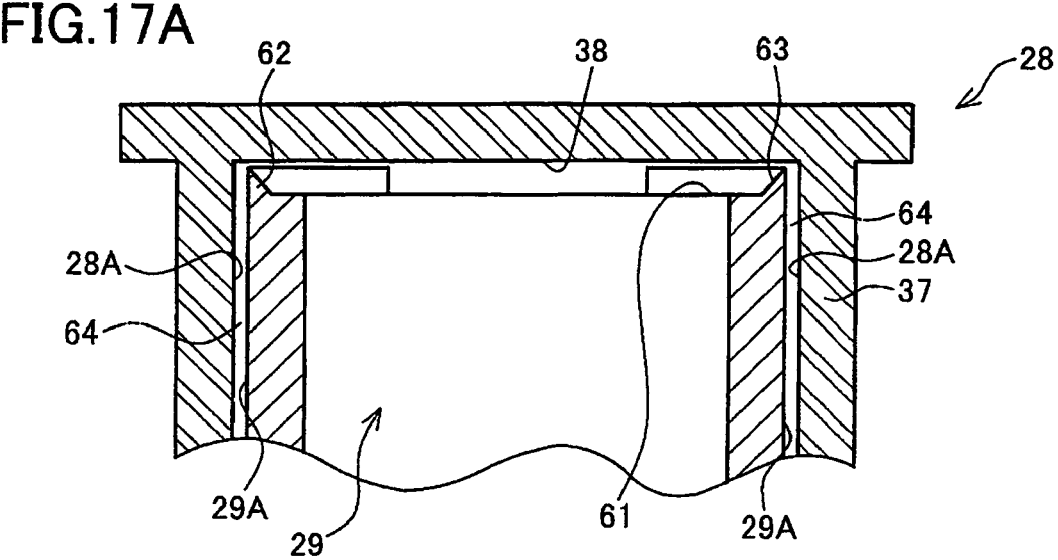
FIG. 17A is a cross-sectional view of the outer fitting portion and the inner fitting portion of the roll sheet holder prior to the welding according to the first embodiment.

As shown in FIG. 17A, when the thus-constructed holder axial member 40 is to be welded to the sheet holding member 12, the inner fitting portion 29 of the holder axial member 40 is first inserted in the outer fitting portion 28 of the sheet holding member 12. More specifically, the holder axial member 40 is positioned with respect to the second cylindrical portion 37 so that the positioning rib 50 aligns with the cutout portion 51, then the inner fitting portion 29 is inserted until the leading end portions of the welding ribs 62 and 63 come into contact with the inner end surface 38.

Figure 17B:
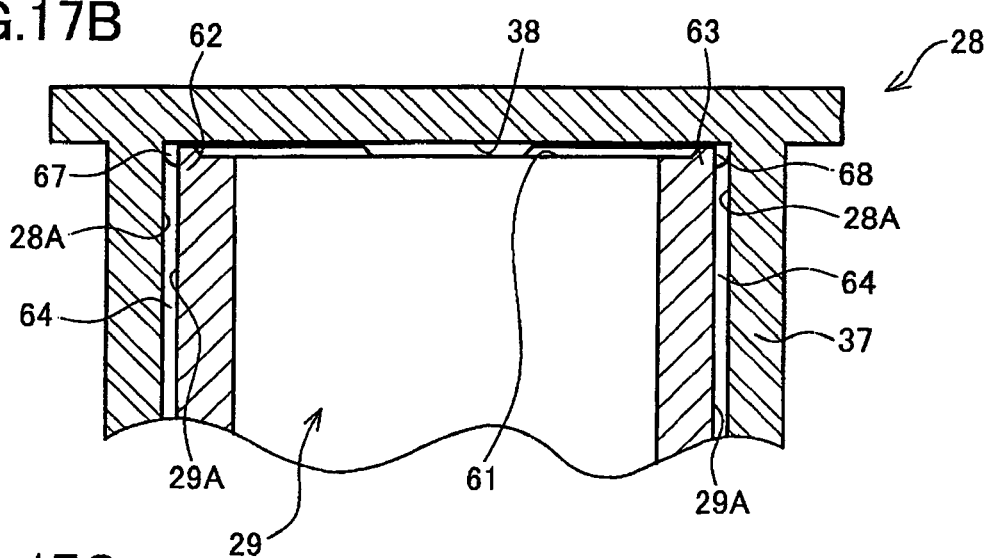
FIG. 17B is a cross-sectional view of the outer fitting portion and the inner fitting portion of the roll sheet holder during the welding according to the first embodiment.

As shown in FIG. 17B, since ultrasonic vibrations are then applied in the state in which the inner fitting portion 29 of the holder axial member 40 is fitted in the outer fitting portion 28 of the sheet holding member 12, the leading end portions of the welding ribs 62 and 63 in contact with the inner end surface 38 melt due to frictional heat from the peak portions of the welding ribs 62 and 63, and melted resin portions 67 and 68 are gradually formed. The thus-melted resin portions 67 and 68 gradually flow outward from a space between the welding ribs 62 and 63 and the inner end surface 38 into the gap 64 formed between the outer peripheral surface 29A of the inner fitting portion 29 and the inner peripheral surface 28A of the outer fitting portion 28.

Figure 17C:
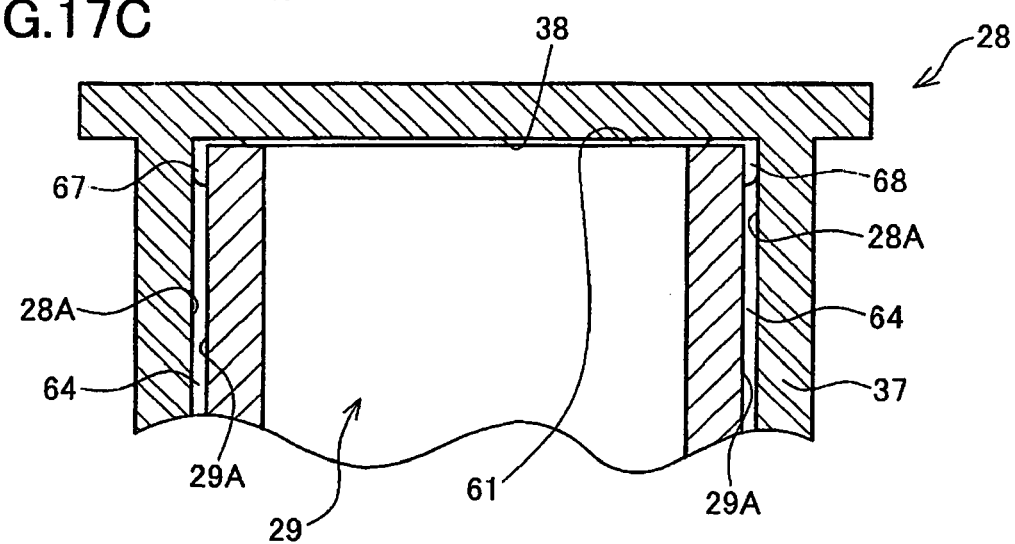
FIG. 17C is a cross-sectional view of the outer fitting portion and the inner fitting portion of the roll sheet holder after the welding according to the first embodiment.

As a result, as shown in FIG. 17C, the welding ribs 62 and 63 are melted completely, and the confronting surface 61 is welded to the inner end surface 38 by the melted resin portions 67 and 68. Also, the outer peripheral surface 29A of the inner fitting portion 29 is welded to the inner-peripheral surface 28A of the outer fitting portion 28 by the melted resin portions 67 and 68.

Therefore, in comparison with welding in which only the confronting surface 61 and the inner end surface 38 are welded together by the melted resin, the gap 64 is filled with the melted resin portions 67 and 68 and thus the welding extends over a wider range from the confronting surface 61 and the inner end surface 38 to the outer peripheral surface 29A of the inner fitting portion 29 and the inner peripheral surface 28A of the outer fitting portion 28. Thus, the weld strength is increased in the fitting direction (the vertical direction in FIGS. 17A through 17C).

In order to investigate an improvement in weld strength, strength tests have been performed on a conventional roll sheet holder having welding only between only the leading end surface 204 and the weld surface 207 (FIGS. 25A through 25C) and the roll sheet holder 3 according to the first embodiment. The results are as described below.

These tests have been performed on roll sheet holders in which the welding is completed, where a gradually increasing load is applied in the fitting direction (downward in FIGS. 17A through 17C) to the holder axial member in a state in which the sheet holding member is fixed thereto, and the load at which the sheet holding member and the holder axial member separate from each other is measured.

Figure 25A:
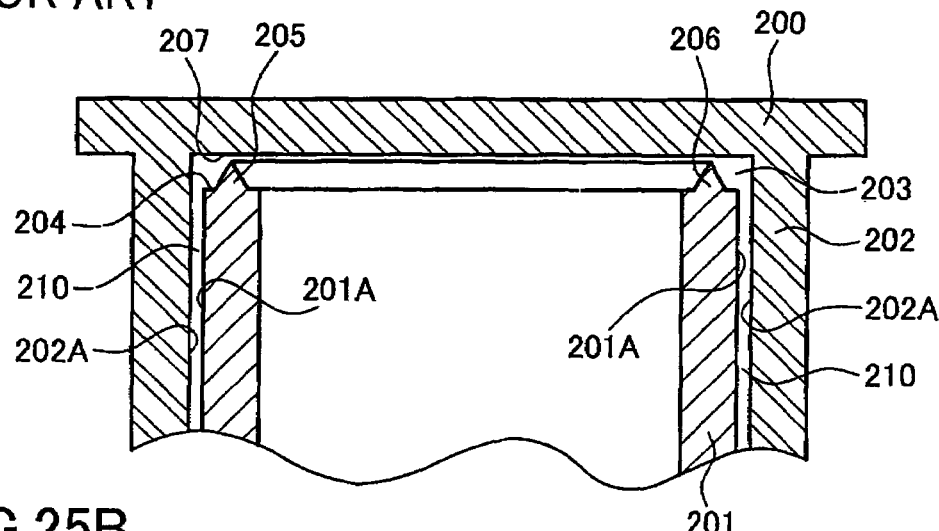
FIG. 25A is a cross-sectional view of an outer fitting portion and an inner fitting portion of a conventional roll sheet holder prior to welding.
Figure 25B:
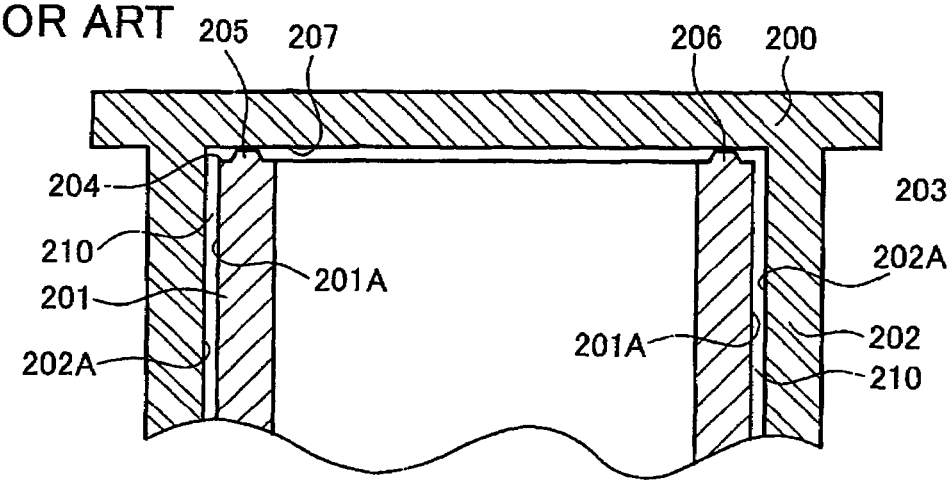
FIG. 25B is a cross-sectional view of the outer fitting portion and the inner fitting portion of the conventional roll sheet holder during the welding.
Figure 25C:
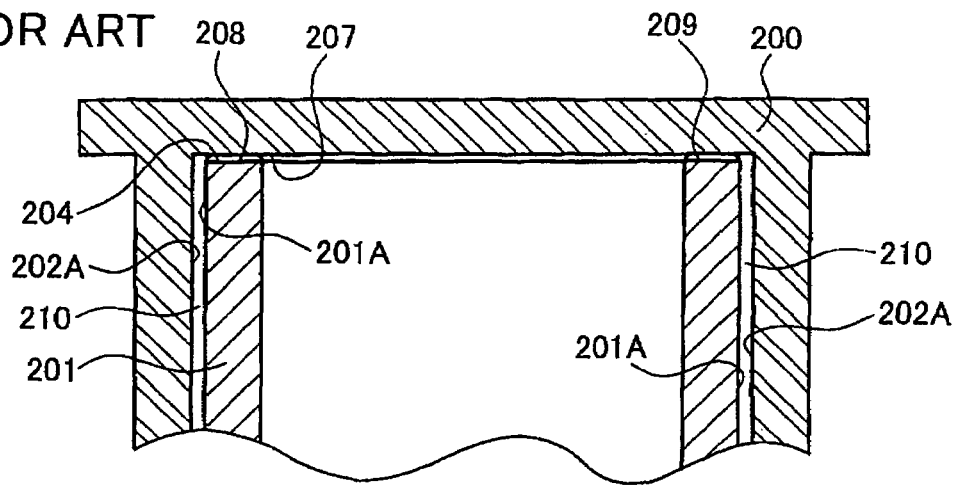
FIG. 25C is a cross-sectional view of the outer fitting portion and the inner fitting portion of the conventional roll sheet holder after the welding.

The results of such testing show that the weld separates when a load of 10 kgf (kilogram force) is applied to the conventional roll sheet holder in which only the leading end surface 204 and the weld surface 207 are welded together (FIGS. 25A through 25C). With the roll sheet holder 3 according to the first embodiment, on the other hand, the welding separates when a load of 25 kgf is applied.

The weld strength in the fitting direction (the vertical direction in FIGS. 17A through 17C) is therefore improved and there is no danger of the weld portion separating, even if the roll sheet holder 3 is dropped accidentally.

The description now turns to the sequence from the installation of the roll sheet holder 3 in the label printer 1 to the acquisition of the user's desired printout. As shown in FIG. 2, the user first inserts the attachment portion 13 of the sheet holding member 12 into the first positioning groove portion 16 of the holder support member 15 so that the lower surface of the leading end portion of the guide member 20 fits into one of the second positioning groove portions 22A through 22D (FIG. 5). In this state, the lower end of the guide member 20 is inserted into the positioning indentation 4A. In this manner, the roll sheet holder 3 is detachably mounted onto the roll-sheet-holder receiving portion 4.

The user then turns the lever 27 upward to pull one side end of the roll sheet 3A into contact with the inner side surface of the guide member 20. The other side end of the roll sheet 3A is inserted into the insertion port 18 (FIG. 6) while in contact with the inner side surface of the guide piece 23 that is erected on the side end portion of the insertion port 18. This enables installment of the roll sheet 3A to the label printer 1 without any variation of position in the widthwise direction.

By inserting the roll sheet 3A through the insertion port 18 and turning the lever 27 upward, the thermal head 31 (FIG. 7) is moved upward and the roll sheet 3A is pressed against the platen roller 26, enabling printing in the label printer 1.

On receiving a print instruction from an external device (not shown), the label printer 1 controls the driving of the thermal head 31 while driving the platen roller 26 in rotation by a stepping motor or the like (not shown). This enables the printing of image data sequentially on the print surface while the roll sheet 3A is being conveyed. This printing is performed on the surface of the conveyed roll sheet 3A that is pressed against the thermal head 31, while the print surface faces downward.

The thus-printed roll sheet 3A passes a cutter plate 8A and moves to a discharge port and the tray 6, in the state in which the print surface faces downward.

The cutter unit 8 that can move reciprocally in the widthwise direction of the roll sheet 3A to cut the roll sheet 3A is disposed on the cutter plate 8A. The roll sheet 3A that has been discharged onto the tray 6 is cut by the cutter unit 8 by the operation of moving the cutter lever 9 to the right. This enables the user to pick up the printout that the user requires.

As described above, in the roll sheet holder 3 according to the first embodiment, the inner fitting portion 29 on which the welding ribs 62 and 63 are formed along the outer periphery of the confronting surface 61 is provided on the holder axial member 40, and also the outer fitting portion 28 that is fitted over the inner fitting portion 29 is formed by the second cylindrical portion 37 on the sheet holding member 12. The welding ribs 62 and 63 in contact with the inner end surface 38 are melted by frictional heat generated by the application of ultrasonic vibrations while the inner fitting portion 29 is fitted in the outer fitting portion 28, so that the confronting surface 61 is welded to the inner end surface 38 and the outer peripheral surface 29A of the inner fitting portion 29 is welded to the inner peripheral surface 28A of the outer fitting portion 28 by the melted resin portions 67 and 68. Thus the gap 64 formed between the outer peripheral surface 29A and the inner peripheral surface 28A is filled with the melted resin portions 67 and 68. In comparison with the construction in which only the confronting surface 61 and the inner end surface 38 are welded together by the melted resin, the construction of the outer fitting portion 28 and the inner fitting portion 29 according to the present embodiment dramatically improves the weld strength. In addition, since the welding by the melted resin extends over a wider range from a space between the confronting surface 61 and the inner end surface 38 to the gap 64 between the outer peripheral surface 29A of the inner fitting portion 29 and the inner peripheral surface 28A of the outer fitting portion 28, the weld strength is improved in the fitting direction (the vertical direction in FIGS. 17A through 17C). The weld strength of the roll sheet holder 3 is therefore improved, thus there is no danger of the weld portion between the holder axial member 40 and the mounting portion 21 separating, even if a strong force is applied from the outside of the roll sheet holder 3, such as that caused by the roll sheet holder 3 falling. Furthermore, the weld area is increased without increasing the size of the welding ribs 62 and 63, and thus the weld strength can be improved, which enables a shortening of the weld time and an improvement in the quality of the external appearance.

Second Embodiment

Figure 18:
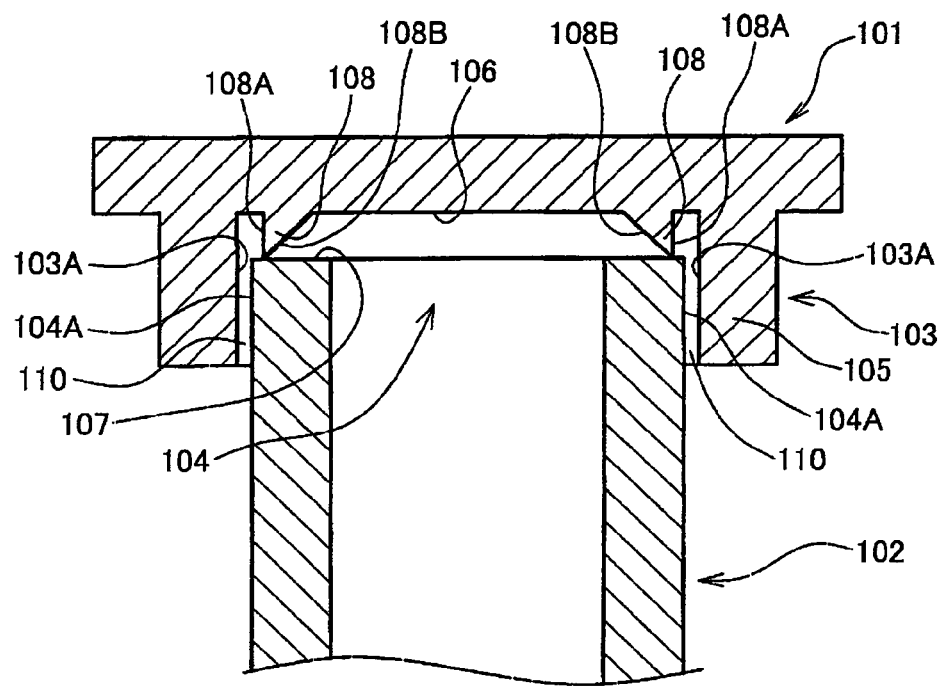
FIG. 18 is a cross-sectional view of an outer fitting portion and an inner fitting portion of a roll sheet holder prior to welding according to a second embodiment of the present invention.

A roll sheet holder according to a second embodiment of the present invention will be described with reference to FIG. 18. FIG. 18 is a cross-sectional view showing a holder axial member 102 and a sheet holding member 101 in the roll sheet holder prior to the welding according to the second embodiment.

The roll sheet holder according to the second embodiment has basically the same construction as the above-described roll sheet holder 3 according to the first embodiment, except that although the welding ribs 62 and 63 that are to be melted by the ultrasonic vibrations during the welding are provided on the holder axial member 40 in the roll sheet holder 3 of the first embodiment (FIG. 17A), a welding rib is provided on the sheet holding member in the roll sheet holder according to the second embodiment. Since this is the only difference from the roll sheet holder 3 of the first embodiment, details of the other structure are the same as those of the roll sheet holder 3 of the first embodiment.

The description below therefore focuses on the characteristic construction of the second embodiment, and like parts and components that are used in the roll sheet holder 3 of the first embodiment are designated by the same reference numerals to avoid duplicating description.

In the roll sheet holder according to the second embodiment, ultrasonic welding is used for fixing, after an inner fitting portion 104 provided at the holder axial member 102 is fitted in an outer fitting portion 103 provided at the sheet holding member 101.

As shown in FIG. 18, the inner fitting portion 104 that is inserted in the outer fitting portion 103 is provided on a leading end portion of the holder axial member 102. The inner fitting portion 104 is configured of a circular cylindrical shape by a leading end portion that is formed continuously from the holder axial member 102, and is provided with a confronting surface 107 that confronts the sheet holding member 101 (or more specifically, confronts the inner end surface 106).

The outer fitting portion 103 is formed at a flat portion on the inside of the sheet holding member 101. The outer fitting portion 103 is configured of: a second cylindrical portion 105 into which the inner fitting portion 104 is inserted; and an inner end surface 106 that is defined in a substantially circular shape by the second cylindrical portion 105. The inner end surface 106 is a flat surface confronting the confronting surface 107. A welding rib 108 is provided peripherally on the inner end surface 106 at a position corresponding to the outer periphery of the confronting surface 107.

The welding rib 108 is formed of two surfaces that together form a substantially right-angled triangle in cross section: an outer side surface 108A that is formed in a direction orthogonal to the inner end surface 106 and a slanted surface 108B that forms a predetermined angle (50° in the second embodiment) with the outer side surface 108A. The height of the welding rib 108 from the inner end surface 106 is 0.5 mm to 0.6 mm. In this case, the welding is performed with a welding rib having a suitable volume, by ensuring that the height of the welding rib 108 is 0.5 mm to 0.6 mm, so that the weld strength can be improved. There is therefore no adverse effect on the components due to excessive welding time, which improves the quality of the external appearance.

The second cylindrical portion 105 is formed in a circular cylindrical shape to follow the shape of the inner fitting portion 104 of the holder axial member 102, and the inner diameter of the circular cylinder of the second cylindrical portion 105 is 0.05 mm to 0.10 mm greater than the outer diameter of the holder axial member 102 that has the inner fitting portion 104. When the inner fitting portion 104 is fitted in the outer fitting portion 103, therefore, a gap 110 (of a spacing of 0.025 mm to 0.050 mm) is formed between an inner peripheral surface 103A of the outer fitting portion 103 (the inner peripheral surface of the second cylindrical portion 105) and an outer peripheral surface 104A of the inner fitting portion 104.

When the holder axial member 102 according to the second embodiment is to be welded to the sheet holding member 101 of the above-described construction, the inner fitting portion 104 of the holder axial member 102 is inserted into the outer fitting portion 103 of the sheet holding member 101. More specifically, the holder axial member 102 is inserted into the second cylindrical portion 105 provided on the sheet holding member 101 until the leading end portion of the welding rib 108 comes into contact with the confronting surface 107.

Ultrasonic vibrations are then applied in the state in which the inner fitting portion 104 of the holder axial member 102 is fitted in the outer fitting portion 103 of the sheet holding member 101. The leading end portion of the welding rib 108 in contact with the confronting surface 107 melts due to frictional heat and a resin portion gradually melts from the peak portion thereof. The thus-melted resin portion gradually flows outward from a space between the welding rib 108 and the confronting surface 107 into the gap 110 formed between the outer peripheral surface 104A of the inner fitting portion 104 and the inner peripheral surface 103A of the outer fitting portion 103.

As a result, the welding rib 108 is melted completely, and the inner end surface 106 is welded to the confronting surface 107 and the inner peripheral surface 103A of the outer fitting portion 103 is welded to the outer peripheral surface 104A of the inner fitting portion 104 by the melted resin.

In the above-described roll sheet holder according to the second embodiment, the outer fitting portion 103 is formed by the second cylindrical portion 105 and the inner end surface 106 on which the welding rib 108 is formed at a position corresponding to the outer periphery of the confronting surface 107, and also the inner fitting portion 104 on which the confronting surface 107 is formed is provided on the holder axial member 102. The welding rib 108 in contact with the confronting surface 107 is melted by frictional heat generated by the application of ultrasonic vibrations while the inner fitting portion 104 is fitted in the outer fitting portion 103, so that the inner end surface 106 is welded to the confronting surface 107 and the inner peripheral surface 103A of the outer fitting portion 103 is welded to the outer peripheral surface 104A of the inner fitting portion 104 by the corresponding melted resin. Thus the gap 110 formed between the components is filled with the melted resin, in contrast to the construction in which only the inner end surface 106 and the confronting surface 107 are welded together by the melted resin. Since the welding by the melted resin extends over a wider range from the space between the inner end surface 106 and the confronting surface 107 to the gap 110 between the inner peripheral surface 103A of the outer fitting portion 103 and the outer peripheral surface 104A of the inner fitting portion 104, the weld strength is improved in the fitting direction (the vertical direction in FIG. 18). The weld strength of the roll sheet holder is therefore improved, and thus there is no danger of the weld portion between the sheet holding member 101 and the holder axial member 102 separating, even if a strong force is applied from the outside of the roll sheet holder 3, such as that caused by the roll sheet holder falling. Furthermore, since the weld area can be increased and the weld strength can be improved without increasing the size of the welding rib 108, the welding time can be shortened, which improves the quality of the external appearance.

Third Embodiment

Figure 19:
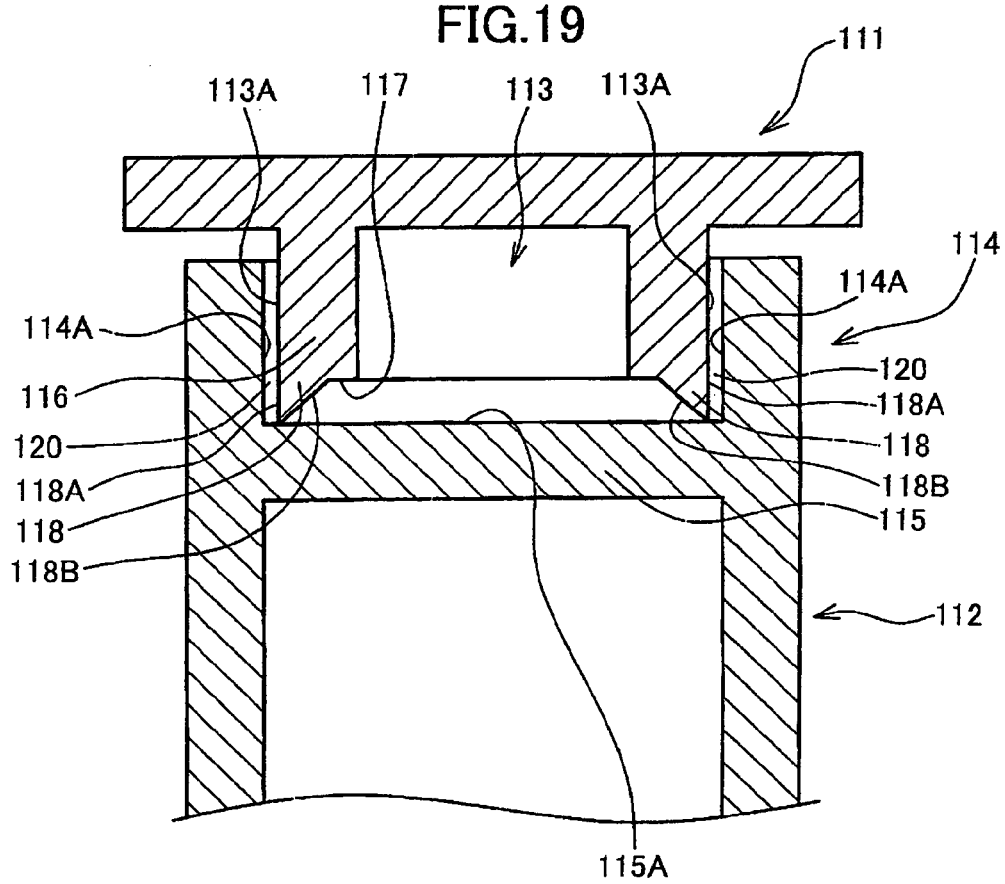
FIG. 19 is a cross-sectional view of an outer fitting portion and an inner fitting portion of a roll sheet holder prior to welding according to a third embodiment of the present invention.

A roll sheet holder according to a third embodiment of the present invention will be described with reference to FIG. 19. FIG. 19 is a cross-sectional view showing a holder axial member 112 and a sheet holding member 111 in the roll sheet holder prior to the welding according to the third embodiment.

The roll sheet holder according to the third embodiment has basically the same construction as the above-described roll sheet holder 3 according to the first embodiment, except that although the outer fitting portion 28 is provided on the sheet holding member 12 and the inner fitting portion 29 is provided on the holder axial member 40 side in the roll sheet holder 3 according to the first embodiment (FIG. 17A), the outer fitting portion is provided on the holder axial member and the inner fitting portion is provided on the sheet holding member in the roll sheet holder according to the third embodiment. Since this is the only difference from the roll sheet holder 3 of the first embodiment, details of the other structure are the same as those of the roll sheet holder 3 of the first embodiment.

The description below therefore focuses on the characteristic construction of the third embodiment, and like parts and components that are used in the roll sheet holder 3 of the first embodiment are designated by the same reference numerals to avoid duplicating description.

In the roll sheet holder according to the third embodiment, ultrasonic welding is used for fixing, after an inner fitting portion 113 provided at the sheet holding member 111 is fitted into an outer fitting portion 114 provided on the holder axial member 112.

As shown in FIG. 19, the outer fitting portion 114 that is fitted over the inner fitting portion 113 provided on the sheet holding member 111 is provided on a leading end portion of the holder axial member 112. The outer fitting portion 114 is configured in a circular cylindrical shape by the leading end portion formed continuously form the holder axial member 112, and an interior wall 115 is provided within the circular cylinder, perpendicularly with respect to the axial direction.

The inner fitting portion 113 is formed on a flat portion on the inside of the sheet holding member 111. The inner fitting portion 113 is configured of a second cylindrical portion 116 that is inserted into the outer fitting portion 114 and a confronting surface 117 that formed on a leading end portion of the second cylindrical portion 116. The confronting surface 117 is a surface that confronts an inner end surface 115A of the interior wall 115, and a welding rib 118 is provided peripherally and integrally thereon at a position corresponding to the outer periphery of the confronting surface 117.

The welding rib 118 is formed of two surfaces that together form a substantially right-angled triangle in cross section: an outer side surface 118A that is formed continuously from the outer peripheral surface of the second cylindrical portion 116 and a slanted surface 118B that forms a predetermined angle (50° in the third embodiment) with the outer side surface 118A. The height h of the welding rib 118 from the confronting surface 117 is 0.5 mm to 0.6 mm. The welding is performed with a welding rib having a suitable volume, by ensuring that the height of the welding rib 118 is 0.5 mm to 0.6 mm, so that the weld strength can be improved. There is therefore no adverse effect on the components due to excessive welding time, which improves the quality of the external appearance.

The second cylindrical portion 116 is formed in a circular cylindrical shape to follow the shape of the outer fitting portion 114 of the holder axial member 112, and the outer diameter of the second cylindrical portion 116 is 0.05 mm to 0.10 mm smaller than the inner diameter of the holder axial member 112 that has the outer fitting portion 114. When the inner fitting portion 113 is fitted in the outer fitting portion 114, therefore, a gap 120 (of a spacing of 0.025 mm to 0.050 mm) is formed between an outer peripheral surface 113A of the inner fitting portion 113 (the outer peripheral surface of the second cylindrical portion 116) and an inner peripheral surface 114A of the outer fitting portion 114.

When the holder axial member 112 according to the third embodiment is to be welded to the sheet holding member 111 of the above-described construction, the inner fitting portion 113 of the sheet holding member 111 is first inserted into the outer fitting portion 114 of the holder axial member 112. More specifically, the second cylindrical portion 116 provided on the sheet holding member 111 is inserted into the interior of the holder axial member 112 until the leading end portion of the welding rib 118 comes into contact with the inner end surface 115A.

Ultrasonic vibrations are then applied in the state in which the outer fitting portion 114 of the holder axial member 112 is fitted over the inner fitting portion 113 of the sheet holding member 111. The leading end portion of the welding rib 118 in contact with the inner end surface 115A melts due to frictional heat and a resin portion gradually melts from the peak portion thereof. The thus-melted resin portion gradually flows outward from a space between the welding rib 118 and the inner end surface 115A into the gap 120 formed between the outer peripheral surface 113A of the inner fitting portion 113 and the inner peripheral surface 114A of the outer fitting portion 114.

As a result, the welding rib 118 is melted completely, and the inner end surface 115A is welded to the confronting surface 117 and the inner peripheral surface 114A of the outer fitting portion 114 is welded to the outer peripheral surface 113A of the inner fitting portion 113 by the melted resin.

In the above-described roll sheet holder according to the third embodiment, the inner fitting portion 113 is formed by the second cylindrical portion 116 on the sheet holding member 111 and the welding rib 118 provided on the outer periphery of the confronting surface 117, and also the outer fitting portion 114 on which the inner end surface 115A is formed on the interior wall 115 is provided within the circular cylinder of the holder axial member 112. The welding rib 118 in contact with the inner end surface 115A is melted by frictional heat generated by the application of ultrasonic vibrations while the inner fitting portion 113 is fitted in the outer fitting portion 114, so that the inner end surface 115A is welded to the confronting surface 117 and the inner peripheral surface 114A of the outer fitting portion 114 is welded to the outer peripheral surface 113A of the inner fitting portion 113 by the corresponding melted resin. Thus the gap 120 formed between the outer peripheral surface 113A and the inner peripheral surface 114A is filled with the melted resin, in contrast to the construction in which only the inner end surface 115A and the confronting surface 117 are welded together by the melted resin. Since the welding by the melted resin extends over a wider range from the space between the inner end surface 115A and the confronting surface 117 to the gap 120 between the inner peripheral surface 114A of the outer fitting portion 114 and the outer peripheral surface 113A of the inner fitting portion 113, the weld strength is improved in the fitting direction (the vertical direction in FIG. 19). The weld strength of the roll sheet holder is therefore improved, and thus there is no danger of the weld portion between the sheet holding member 111 and the holder axial member 112 separating, even if a strong force is applied from the outside of the roll sheet holder 3, such as that caused by the roll sheet holder falling. Furthermore, since the weld area can be increased and the weld strength improved without increasing the size of the welding rib 118, the welding time can be shortened, which improves the quality of the external appearance.

Fourth Embodiment

A roll sheet holder according to a fourth embodiment of the present invention will be described with reference to FIGS. 20 through 22B. The roll sheet holder according to the fourth embodiment has basically the same construction as the above-described roll sheet holder 3 according to the first embodiment. In the roll sheet holder 3 according to the first embodiment, the welding ribs 62 and 63 that are melted by the ultrasonic vibrations during the welding are provided on the holder axial member 40, and the holder axial member 40 and the sheet holding member 12 are welded together by melting the welding ribs 62 and 63 (FIGS. 17A through 17C). However, in the roll sheet holder according to the fourth embodiment, instead of providing a welding rib, at least part of an outer peripheral surface of an inner fitting portion comes in contact with an inner peripheral surface of an outer fitting portion when the inner fitting portion provided on the holder axial member is fitted in the outer fitting portion provided on the sheet holding member 12, and these contacted surfaces are welded. Since this is the only difference from the roll sheet holder 3 of the first embodiment, details of the other structure are the same as those of the roll sheet holder 3 of the first embodiment.

The description below therefore focuses on the characteristic construction of the forth embodiment, and like parts and components that are used in the roll sheet holder 3 of the first embodiment are designated by the same reference numerals to avoid duplicating description.

Figure 20:
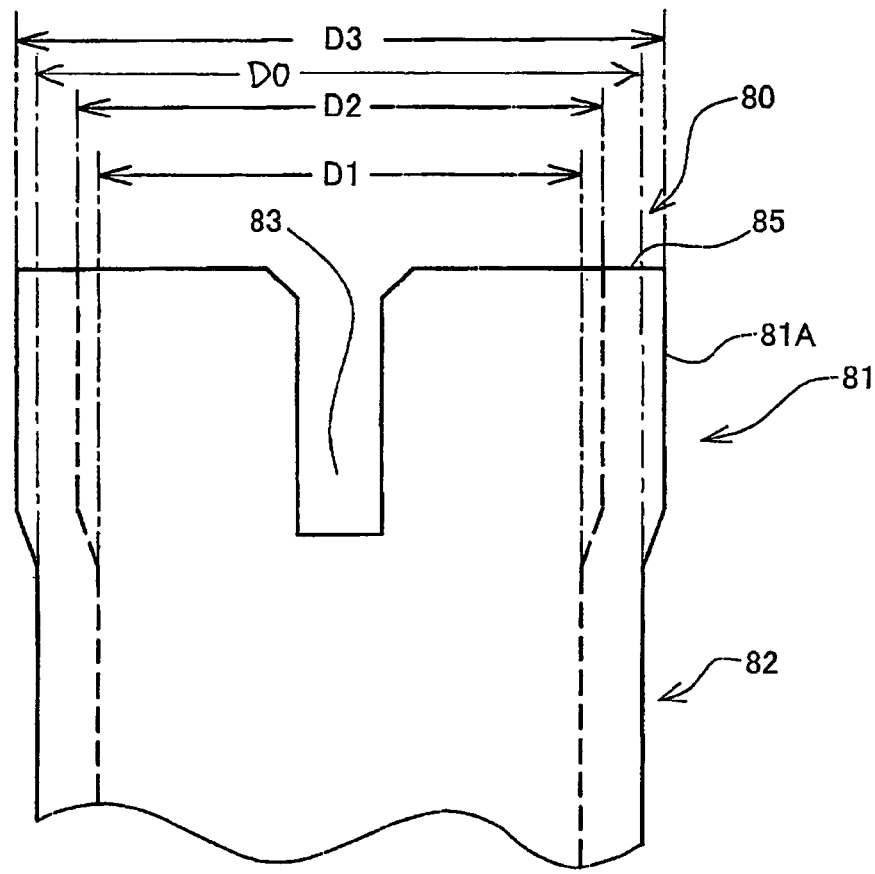
FIG. 20 is a side view of a holder axial member of a roll sheet holder prior to welding according to a fourth embodiment of the present invention.
Figure 21:
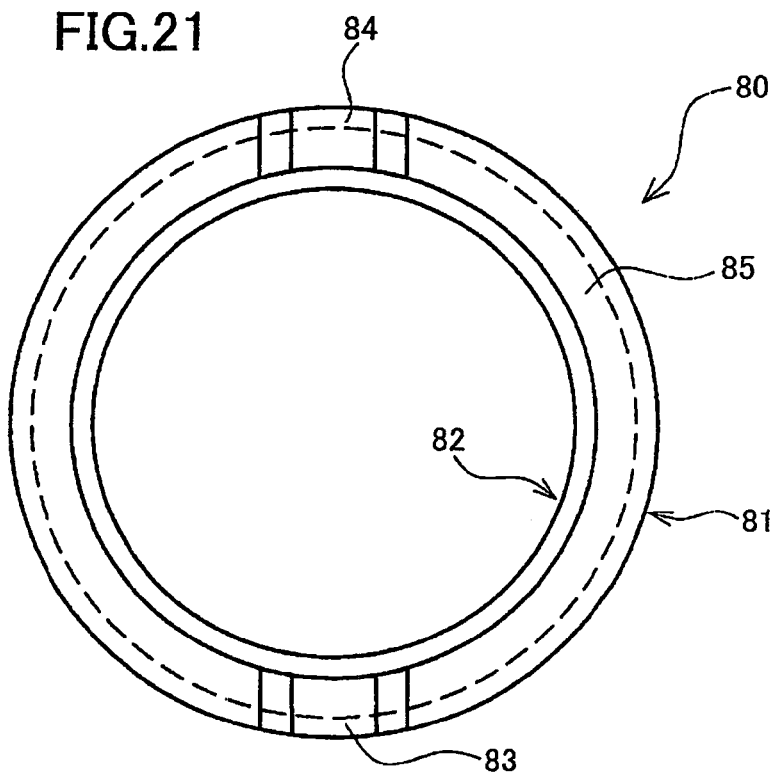
FIG. 21 is a plan view of the holder axial member of the roll sheet holder prior to the welding according to the fourth embodiment.

A holder axial member 80 of the roll sheet holder according to the fourth embodiment will be described with reference to FIGS. 20 and 21. FIG. 20 is a front view of the holder axial member in the roll sheet holder according to the fourth embodiment. FIG. 21 is a plan view of the holder axial member in the roll sheet holder according to the fourth embodiment.

As shown in FIGS. 20 and 21, the holder axial member 80 according to the fourth embodiment is a cylindrical member having an inner diameter D1. An inner fitting portion 81 that is fitted in the outer fitting portion 28 is provided at one end of the holder axial member 80. An inner diameter D2 of the inner fitting portion 81 is larger than the inner diameter D1 of a middle portion 82 of the holder axial member 80 (larger by approximately 1 mm in the fourth embodiment). Similarly, an outer diameter D3 of the inner fitting portion 81 is larger than an outer diameter D0 of the middle portion 82. Here, the middle portion 82 is formed in a coaxial relationship with the inner fitting portion 81. Also, the outer diameter D3 of the inner fitting portion 81 is larger than an inner diameter D4 (FIG. 22A) of the outer fitting portion 28 (larger by approximately 0.5 mm in the fourth embodiment).

In addition, cutout portions 83 and 84 are formed in the inner fitting portion 81 along the axial direction. As shown in FIG. 21, the cutout portions 83 and 84 are formed at symmetrical positions on either side of the central axis. As shown in FIG. 20, the cutout portions 83 and 84 are formed from the leading end portion of the inner fitting portion 81 as long as the inner fitting portion 81 extends in the axial direction (the range in which the inner diameter is D2). By providing the cutout portions 83 and 84, the diameter of the inner fitting portion 81 can be varied in response to external loads within a certain amount of range.

Figure 22A:
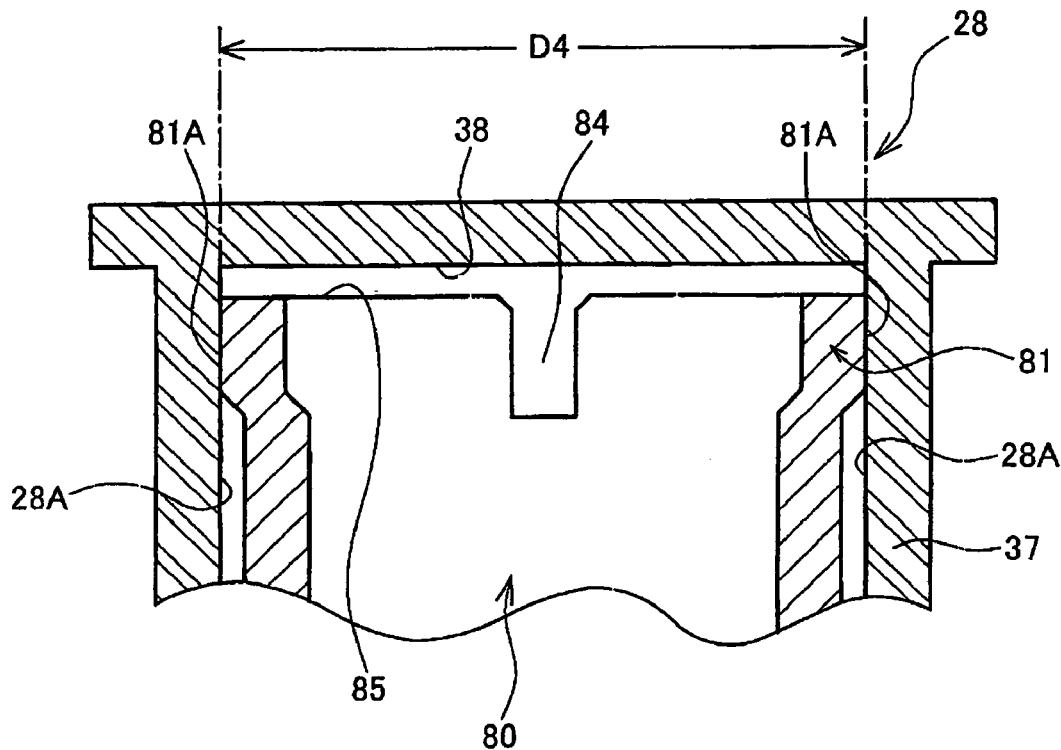
FIG. 22A is a cross-sectional view of an outer fitting portion and an inner fitting portion of the roll sheet holder prior to the welding according to the fourth embodiment.
Figure 22B:
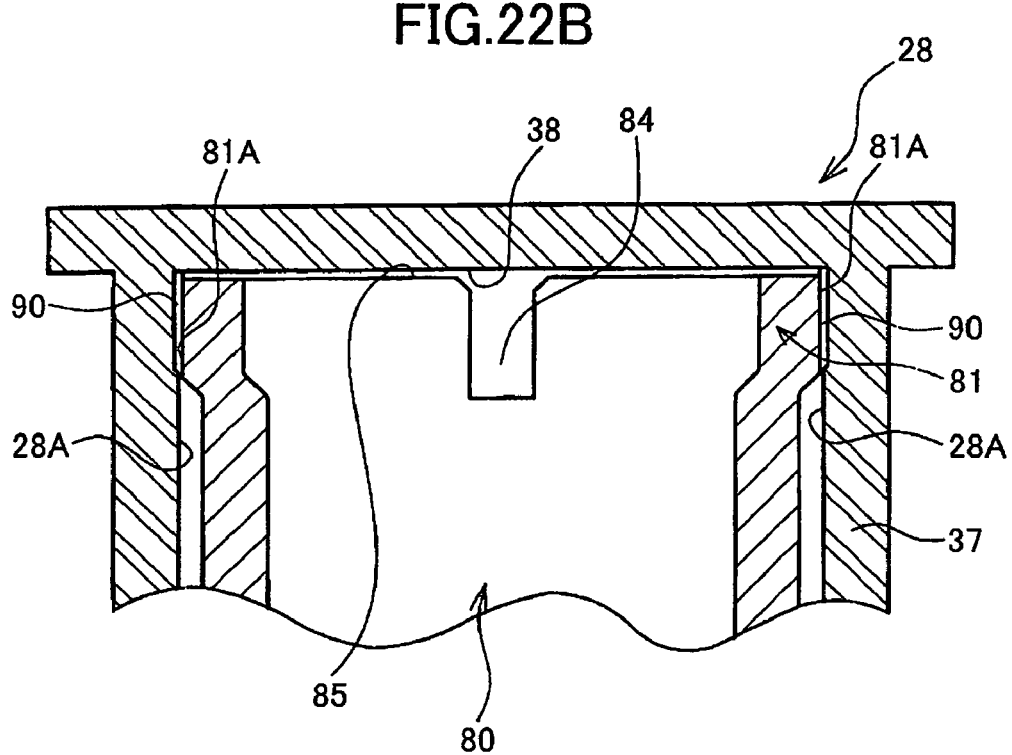
FIG. 22B is a cross-sectional view of the outer fitting portion and the inner fitting portion of the roll sheet holder after the welding according to the fourth embodiment.

As shown in FIG. 22A and 22B, the outer fitting portion 28 that is fitted over the inner fitting portion 81 is provided at the sheet holding member 12. The outer fitting portion 28 is configured of: the second cylindrical portion 37 that is formed in a substantially circular shape to correspond to the shape of the leading end portion of the holder axial member 80; and the inner end surface 38 that is defined in a substantially circular shape by the second cylindrical portion 37. The inner diameter of the second cylindrical portion 37 is approximately 0.5 mm smaller than the outer diameter of the inner fitting portion 81. The holder axial member 80 is fixed to the sheet holding member 12 by ultrasonic welding, as will be described later, after the leading end portion (the inner fitting portion 81) of the holder axial member 80 and the second cylindrical portion 37 have been connected.

The weld structure during the welding of the holder axial member 80 to the sheet holding member 12 in the above-described construction will now be described with reference to FIGS. 22A and 22B. FIG. 22A is a cross-sectional view of the outer fitting portion 28 and the inner fitting portion 81 prior to the welding. FIG. 22B is a cross-sectional view of the outer fitting portion 28 and the inner fitting portion 81 after the welding.

As shown in FIG. 22A, when the holder axial member 80 is to be welded to the sheet holding member 12, the inner fitting portion 81 of the holder axial member 80 is first inserted in the outer fitting portion 28 of the sheet holding member 12. More specifically, the holder axial member 80 is pressed into the second cylindrical portion 37 from the leading end portion thereof, so that a confronting surface 85 that confronts the sheet holding member 12 (or more specifically, confronts the inner end surface 38) is inserted a predetermined distance into contact with the inner end surface 38. Since the outer diameter D3 of the inner fitting portion 81 is greater than the inner diameter D4 of the outer fitting portion 28, as described above, and also the cutout portions 83 and 84 are formed to enable variation in response to external load on the diameter of the inner fitting portion 81 within a certain amount of range, the diameter of the inner fitting portion 81 is slightly reduced to match the diameter of the outer fitting portion 28 and thus an outer peripheral surface 81A of the inner fitting portion 81 that is in contact with the inner peripheral surface 28A of the outer fitting portion 28 of the sheet holding member 12.

As shown in FIG. 22B, ultrasonic vibrations are then applied in the state in which the inner fitting portion 81 of the holder axial member 80 is fitted in the outer fitting portion 28 of the sheet holding member 12. The inner peripheral surface 28A of the outer fitting portion 28 and the outer peripheral surface 81A of the inner fitting portion 81 in contact with each other melt due to frictional heat, and a melted resin portion 90 is gradually formed. The melted resin portion 90 forms a weld between the outer peripheral surface 81A of the inner fitting portion 81 and the inner peripheral surface 28A of the outer fitting portion 28.

In the above-described roll sheet holder according to the fourth embodiment, the inner peripheral surface 28A of the outer fitting portion 28 and the outer peripheral surface 81A of the inner fitting portion 81 in contact with each other are each melted by frictional heat by pressing the inner fitting portion 81 provided at the leading end portion of the holder axial member 80 to the outer fitting portion 28 provided at the sheet holding member 12 and applying ultrasonic vibration thereto in the fitted state. Since this ensures that the inner peripheral surface 28A of the outer fitting portion 28 and the outer peripheral surface 81A of the inner fitting portion 81 are welded together by melted resin over a wide range, without forming a gap between the components, the weld strength is improved in the fitting direction (the vertical direction in FIGS. 22A and 22B). The weld strength of the roll sheet holder is therefore improved, and thus there is no danger of the weld portion between the sheet holding member 12 and the holder axial member 80 separating, even if a strong force is applied from the outside of the roll sheet holder 3, such as that caused by the roll sheet holder falling. Furthermore, since the welding can be performed without melting any component such as a welding rib, the welding time can be shortened, which improves the quality of the external appearance.

In addition, since the outer diameter D3 of the inner fitting portion 81 is greater than the inner diameter D4 of the outer fitting portion 28 and also the cutout portions 83 and 84 are formed to be capable of varying in response to external load on the diameter of the inner fitting portion 81 within a certain amount of range, the outer peripheral surface 81A of the inner fitting portion 81 of the holder axial member 80 can contact the inner peripheral surface 28A of the outer fitting portion 28 of the sheet holding member 12 appropriately. At this time, the cutout portions 83 and 84 enable adjustment within a certain amount of range, even if there is some variation in the diameter of the outer fitting portion 28 and the inner fitting portion 81, thus increasing the dimensional tolerances of the outer fitting portion 28 and the inner fitting portion 81 during the molding process.

Fifth Embodiment

A roll sheet holder according to a fifth embodiment of the present invention will be described with reference to FIG. 23. The roll sheet holder according to the fifth embodiment has basically the same construction as the above-described roll sheet holder according to the fourth embodiment, except that although the roll sheet holder of the fourth embodiment has a construction such that the cutout portions 83 and 84 are formed in the inner fitting portion 81 of the holder axial member 80 (FIG. 20), the roll sheet holder according to the fifth embodiment has a cutout portion formed in the outer fitting portion of the sheet holding member. Since this is the only difference from the roll sheet holder of the fourth embodiment, details of the other structure are the same as those of the roll sheet holder of the fourth embodiment.

The description below therefore focuses on the characteristic construction of the fifth embodiment, and like parts and components that are used in the roll sheet holder of the fourth embodiment are designated by the same reference numerals to avoid duplicating description.

As shown in FIG. 23, a holder axial member 153 of the roll sheet holder according to the fifth embodiment is a cylindrical member having an outer diameter D5. An inner fitting portion 154 that is fitted in an outer fitting portion 152 formed at a sheet holding member 151 (which will be described later) is constituted by a circular cylindrical wall of the holder axial member 153 on one end portion of the holder axial member 153.

The outer fitting portion 152 is configured of a second cylindrical portion 155, which is formed in a substantially circular shape to correspond to the shape of the leading end portion of the holder axial member 153. An inner diameter D6 of the second cylindrical portion 155 is approximately 0.5 mm smaller than the outer diameter D5 of the holder axial member 153.

A cutout portion 156 is formed in the outer fitting portion 152 along the axial direction of the holder axial member 153. The provision of the cutout portion 156 enables the diameter of the outer fitting portion 152 to vary in response to external loads, within a certain amount of range.

The weld structure during the welding of the holder axial member 153 to the sheet holding member 151 according to the fifth embodiment will be described. When the holder axial member 153 is to be welded to the sheet holding member 151, the inner fitting portion 154 of the holder axial member 153 is first fitted in the outer fitting portion 152 of the sheet holding member 151. More specifically, the holder axial member 153 is pressed into the second cylindrical portion 155 from the leading end portion thereof. Since the outer diameter D5 of the inner fitting portion 154 is greater than the inner diameter D6 of the outer fitting portion 152 and also the cutout portion 156 is formed to enable variation in response to external load on the diameter of the outer fitting portion 152 within a certain amount of range, the inner diameter of the outer fitting portion 152 is slightly increased to match the outer diameter of the inner fitting portion 154, and thus an outer peripheral surface 154A of the inner fitting portion 154 comes into contact with an inner peripheral surface 152A of the outer fitting portion 152 of the sheet holding member 151.

Ultrasonic vibrations are then applied in the state in which the inner fitting portion 154 of the holder axial member 153 is fitted in the outer fitting portion 152 of the sheet holding member 151. The inner peripheral surface 152A of the outer fitting portion 152 and the outer peripheral surface 154A of the inner fitting portion 154 in contact with each other melt due to frictional heat, and a weld is formed between the outer peripheral surface 154A of the inner fitting portion 154 and the inner peripheral surface 152A of the outer fitting portion 152.

In the above-described roll sheet holder according to the fifth embodiment, the inner peripheral surface 152A of the outer fitting portion 152 and the outer peripheral surface 154A of the inner fitting portion 154 in contact with each other are each melted by frictional heat by pressing the inner fitting portion 154 into the outer fitting portion 152 and applying ultrasonic vibration thereto in the fitted state. Since this ensures that the inner peripheral surface 152A of the outer fitting portion 152 and the outer peripheral surface 154A of the inner fitting portion 154 are welded together by melted resin over a wide range, without forming a gap between the components, the weld strength is improved in the fitting direction (the vertical direction in FIG. 23). The weld strength of the roll sheet holder is therefore improved, and thus there is no danger of the weld portion between the sheet holding member 151 and the holder axial member 153 separating, even if a strong force is applied from the outside of the roll sheet holder 3, such as that caused by the roll sheet holder falling. Furthermore, since the welding can be performed without melting any component such as a welding rib, the welding time can be shortened, which improves the quality of the external appearance.

In addition, since the outer diameter D5 of the inner fitting portion 154 is greater than the inner diameter D6 of the outer fitting portion 152 and also the cutout portion 156 is formed to be capable of varying in response to external load on the diameter of the outer fitting portion 152 within a certain amount of range, the inner peripheral surface 152A of the outer fitting portion 152 of the sheet holding member 151 can be in contact with the outer peripheral surface 154A of the inner fitting portion 154 of the holder axial member 153 appropriately. At this time, the cutout portion 156 enables a certain amount of adjustment, even if there is some variation in the diameter of the outer fitting portion 152 and the inner fitting portion 154, thus increasing the dimensional tolerances of the outer fitting portion 152 and the inner fitting portion 154 during the molding process.

Sixth Embodiment

A roll sheet holder according to a sixth embodiment of the present invention will be described with reference to FIG. 24. The roll sheet holder according to the sixth embodiment has basically the same construction as the above-described roll sheet holder according to the fifth embodiment. However, although in the roll sheet holder of the fifth embodiment the outer fitting portion 152 is provided at the sheet holding member 151 and the inner fitting portion 154 is provided at the holder axial member 153 (FIG. 23), in the roll sheet holder according to the sixth embodiment the outer fitting portion is provided at the holder axial member and the inner fitting portion is provided at the sheet holding member. Since this is the only difference from the roll sheet holder of the fifth embodiment, details of the other structure are the same as those of the roll sheet holder of the fifth embodiment.

The description below therefore focuses on the characteristic construction of the sixth embodiment, and like parts and components that are used in the roll sheet holder of the fifth embodiment are designated by the same reference numerals to avoid duplicating description.

As shown in FIG. 24, a holder axial member 163 of the roll sheet holder according to the sixth embodiment is a cylindrical member having an inner diameter D8. An outer fitting portion 164 that is fitted over the inner fitting portion 162 formed in the sheet support member 161 (which will be described later) is constituted by a circular cylindrical wall on one end portion of the holder axial member 163.

The inner fitting portion 162 is configured of a second cylindrical portion 165, which is formed in a substantially circular shape to correspond to the shape of the leading end portion of the holder axial member 163. An outer diameter D7 of the second cylindrical portion 165 is approximately 0.5 mm greater than the inner diameter D8 of the holder axial member 163.

A cutout portion 166 is formed in the outer fitting portion 164 along the axial direction of the holder axial member 163. By providing the cutout portion 166, the diameter of the outer fitting portion 164 can be varied in response to external loads within a certain amount of range.

The weld structure during the welding of the holder axial member 163 to the inner fitting portion 162 according to the sixth embodiment will be described. When the holder axial member 163 is to be welded to the sheet support member 161, the outer fitting portion 164 of the holder axial member 163 is first fitted over the inner fitting portion 162 of the sheet holding member 161. More specifically, the second cylindrical portion 165 provided on the sheet support member 161 is pressed into the holder axial member 163 from the leading end portion thereof, to be fitted in the outer fitting portion 164. Since the outer diameter D7 of the inner fitting portion 162 is greater than the inner diameter D8 of the outer fitting portion 164, and also the cutout portion 166 is formed to enable variations in response to external load on the diameter of the outer fitting portion 164 within a certain amount of range, the inner diameter of the outer fitting portion 164 is slightly increased to match the outer diameter of the inner fitting portion 162, and thus an outer peripheral surface 162A of the inner fitting portion 162 comes into contact with an inner peripheral surface 164A of the outer fitting portion 164 of the holder axial member 163.

Ultrasonic vibrations are then applied in the state in which the inner fitting portion 162 of the sheet support member 161 is fitted in the outer fitting portion 164 of the holder axial member 163. The inner peripheral surface 164A of the outer fitting portion 164 and the outer peripheral surface 162A of the inner fitting portion 162 in contact with each other melt due to frictional heat, forming a weld between the outer peripheral surface 162A of the inner fitting portion 162 and the inner peripheral surface 164A of the outer fitting portion 164.

In the above-described roll sheet holder according to the sixth embodiment, the inner peripheral surface 164A of the outer fitting portion 164 and the outer peripheral surface 162A of the inner fitting portion 162 in contact with each other are each melted by frictional heat by pressing the inner fitting portion 162 provided at the sheet support member 161 into the outer fitting portion 164 provided at the holder axial member 163. Since this ensures that the inner peripheral surface 164A of the outer fitting portion 164 and the outer peripheral surface 162A of the inner fitting portion 162 are welded together by melted resin over a wide range without forming a gap between the components, the weld strength is improved in the fitting direction (the vertical direction in FIG. 24). The weld strength of the roll sheet holder is therefore improved, and thus there is no danger of the weld portion between the sheet holding member 161 and the holder axial member 163 separating, even if a strong force is applied from the outside of the roll sheet holder, such as that caused by the roll sheet holder falling. Furthermore, since the welding can be performed without melting any component such as a welding rib, the welding time can be shortened, which improves the quality of the external appearance.

In addition, since the inner diameter DB of the outer fitting portion 164 is greater than the outer diameter D7 of the inner fitting portion 162 and also the cutout portion 166 is formed to be capable of varying in response to external load on the diameter of the outer fitting portion 164 within a certain amount of range, the outer peripheral surface 162A of the inner fitting portion 162 of the sheet holding member 161 can come into contact with the inner peripheral surface 164A of the outer fitting portion 164 of the holder axial member 163 appropriately. At this time, the cutout portion 166 enables adjustment within a certain amount of range, even if there is some variation in the diameter of the outer fitting portion 164 and the inner fitting portion 162, thus increasing the dimensional tolerances of the outer fitting portion 164 and the inner fitting portion 162 during the molding process.

In the sixth embodiment, the cutout portion 166 is formed at the outer fitting portion 164 of the holder axial member 163, but the cutout portion may be provided at the inner fitting portion 162 of the sheet holding member 161.

While the invention has been described in detail with reference to the specific embodiment thereof, it would be apparent to those skilled in the art that various changes and modifications may be made therein without departing from the spirit of the invention.

For example, in the first through sixth embodiments a cutout portion is formed on either the outer fitting portion or the inner fitting portion in order to provide adjustment of the diameter of the outer fitting portion or inner fitting portion in response to external loading. However, such cutout portions may be formed on both of the outer fitting portion and the inner fitting portion. In addition, a plurality of cutout portions may be formed on either the outer fitting portion or the inner fitting portion, instead of a single cutout portion.

What is claimed is:

1. A rolled-print-medium holder device for rotatably holding a rolled print medium having a center hollow portion, comprising:
    an axial member that extends in an axial direction and having both axial ends, the axial member being inserted through the center hollow portion;
    a holding member fixed to at least one of the both axial ends of the axial member and holding both sides of the rolled print medium;
    an outer fitting portion provided at either one of the axial member and the holding member, the outer fitting portion having an inner peripheral surface;
    an inner fitting portion provided at the other one of the axial member and the holding member, the inner fitting portion having an outer peripheral surface, the inner fitting portion being fitted into the outer fitting portion; and
    a weld portion provided at least at an outer periphery of one of the inner fitting portion and the outer fitting portion, the weld portion being configured on either the inner fitting portion or the outer fitting portion such that the weld portion at least fixes the outer peripheral surface to the inner peripheral surface by ultrasonic welding, the weld portion including a welding rib structured to have a substantially right angle triangle shape prior to welding, and to melt across a corner of the inner fitting portion after welding,
    wherein the welding rib includes, prior to welding:
        an outer side surface formed in the axial direction continuously from the outer peripheral surface; and
        a slanted surface forming a predetermined acute angle with the outer side surface.

2. The rolled-print-medium holder device according to claim 1, wherein the outer fitting portion is provided at the holding member and the inner fitting portion is provided at the axial member;
    wherein the inner fitting portion further has a holding-member confronting surface positioned at one axial end of the axial member, the holding member confronting surface confronting the holding member;
    wherein the welding rib is formed at an outer periphery of the holding-member confronting surface; and
    wherein a predetermined width of gap is formed between the outer peripheral surface and the inner peripheral surface when the inner fitting portion is fitted into the outer fitting portion.

3. The rolled-print-medium holder device according to claim 2, wherein the welding rib has a height of 0.5 to 0.6 millimeter in the axial direction from the holding-member confronting surface.

4. The rolled-print-medium holder device according to claim 1, wherein
the predetermined acute angle is substantially 50 degrees with the outer side surface.

5. A rolled-print-medium holder device for rotatably holding a rolled print medium having a center hollow portion, comprising:
an axial member that extends in an axial direction and having both axial ends, the axial member being inserted through the center hollow portion;
a holding member fixed to at least one of the both axial ends of the axial member and holding both sides of the rolled print medium;
an outer fitting portion provided at either one of the axial member and the holding member, the outer fitting portion having an inner peripheral surface;
an inner fitting portion provided at the other one of the axial member and the holding member, the inner fitting portion having an outer peripheral surface, the inner fitting portion being fitted into the outer fitting portion; and
a weld portion provided at least at one of the inner fitting portion and the outer fitting portion, the weld portion being configured on either the inner fitting portion or the outer fitting portion such that the weld portion at least fixes the outer peripheral surface to the inner peripheral surface by ultrasonic welding,
wherein the outer fitting portion is provided at the axial member and the inner fitting portion is provided at the holding member;
wherein the outer fitting portion has an inner end surface that confronts the holding member;
wherein the inner fitting portion includes an inner-end-surface confronting surface that confronts the inner end surface;
wherein the weld portion includes a welding rib structured to have a substantially right angle triangle shape prior to welding, and to melt across a corner of the inner fitting portion after welding, the welding rib is formed at an outer periphery of the inner-end-surface confronting surface before welding, and includes, before welding:
an outer side surface formed in the axial direction continuously from the outer peripheral surface; and
a slanted surface forming a predetermined acute angle with the outer side surface;
wherein a predetermined width of gap is formed between the outer peripheral surface and the inner peripheral surface when the inner fitting portion is fitted into the outer fitting portion.

6. The rolled-print-medium holder device according to claim 5, wherein the welding rib has a height of 0.5 to 0.6 millimeter in the axial direction from the holding-member confronting surface.

7. A rolled-print-medium holder device for rotatably holding a rolled print medium having a center hollow portion, comprising:
an axial member that extends in an axial direction and having both axial ends, the axial member being inserted through the center hollow portion;
a holding member fixed to at least one of the both axial ends of the axial member and holding both sides of the rolled print medium;
an outer fitting portion provided at either one of the axial member and the holding member, the outer fitting portion having an inner peripheral surface;
an inner fitting portion provided at the other one of the axial member and the holding member, the inner fitting portion having an outer peripheral surface, the inner fitting portion being fitted into the outer fitting portion; and
a weld portion provided at least at one of the inner fitting portion and the outer fitting portion, the weld portion being configured on either the inner fitting portion or the outer fitting portion such that the weld portion at least fixes the outer peripheral surface to the inner peripheral surface by ultrasonic welding,
wherein the outer fitting portion is provided at the holding member and the inner fitting portion is provided at the axial member;
wherein the inner fitting portion further has a holding-member confronting surface positioned at one axial end of the axial member, the holding-member confronting surface confronting an inner end surface of the holding member;
wherein the welding portion includes a welding rib structured to have a substantially right angle triangle shape prior to welding, and to melt across a corner of the inner fitting portion after welding, the welding rib is formed at the inner end surface at a position corresponding to an outer periphery of the holding-member confronting surface before welding, and includes, before welding:
an outer side surface formed to extend in the axial direction from the inner end surface; and
a slanted surface forming a predetermined acute angle with the outer side surface; and
wherein a predetermined width of gap is formed between the outer peripheral surface and the inner peripheral surface when the inner fitting portion is fitted into the outer fitting portion.

* * * * *